US012597166B2

(12) United States Patent (10) Patent No.: US 12,597,166 B2
Iizuka et al. (45) Date of Patent: Apr. 7, 2026

(54) INFORMATION PROCESSING APPARATUS, INFORMATION PROCESSING METHOD, AND RECORDING MEDIUM

(71) Applicant: CASIO COMPUTER CO., LTD., Tokyo (JP)

(72) Inventors: Nobuo Iizuka, Tokyo (JP); Naotomo Miyamoto, Tokyo (JP); Masaaki Kikuchi, Tokyo (JP); Taichi Murakami, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/891,540

(22) Filed: Sep. 20, 2024

(65) Prior Publication Data

US 2025/0104279 A1 Mar. 27, 2025

(30) Foreign Application Priority Data

Sep. 22, 2023 (JP) ................................. 2023-158279

(51) Int. Cl.
*G06T 7/80* (2017.01)
*G06T 7/70* (2017.01)

(52) U.S. Cl.
CPC . *G06T 7/80* (2017.01); *G06T 7/70* (2017.01)

(58) Field of Classification Search
CPC ... G06T 7/80; G06T 7/70; G06T 2207/30244; G06T 2207/30252; G06T 7/73
See application file for complete search history.

(56) References Cited

U.S. PATENT DOCUMENTS 9,174,830 B1* 11/2015 Bell ..................... G05D 1/0246
2009/0290032 A1* 11/2009 Zhang ....................... G06T 7/80
348/211.9

(Continued)

FOREIGN PATENT DOCUMENTS

CN 104718750 B * 3/2018 ........... H04N 17/002
JP 2005351869 A 12/2005

(Continued)

OTHER PUBLICATIONS

English Translation WO-2019026320-A1 (Year: 2019).*

*Primary Examiner* — Fernando Alcon
(74) *Attorney, Agent, or Firm* — Scully, Scott, Murphy & Presser, P.C.

(57) ABSTRACT

A high-precision positioning result in self-positioning is provided. An information processing apparatus acquires a first coordinate position inside an image of each light source included in an image captured with an imaging device among multiple light sources whose coordinate positions are known in a three-dimensional space to derive at least a coordinate position or an orientation of an own device in the three-dimensional space based on a coordinate position of the light source included in the image in the three-dimensional space and the first coordinate position. The apparatus estimates a height of the imaging device in the three-dimensional space to perform positioning processing using information on the estimated height of the imaging device, acquires a second coordinate position of the light source on the image corresponding to the positioning processing result, and corrects the height of the imaging device based on the first coordinate position and the second coordinate position.

8 Claims, 25 Drawing Sheets

(56)        References Cited

U.S. PATENT DOCUMENTS

| | | | | |
|---|---|---|---|---|
| 2017/0103546 A1* | 4/2017 | Wang | ...................... | B60R 11/04 |
| 2017/0205237 A1* | 7/2017 | White | .................. | G01C 21/206 |
| 2018/0357791 A1* | 12/2018 | Dworakowski | ........... | G06T 7/74 |
| 2019/0265722 A1* | 8/2019 | Haeusler | ................ | G06V 20/10 |
| 2020/0134896 A1* | 4/2020 | Chang | ...................... | G06T 7/73 |
| 2021/0230842 A1* | 7/2021 | Vorobiev | ................. | G06T 7/50 |
| 2021/0295548 A1* | 9/2021 | Veiga | ........................ | G06T 7/73 |
| 2021/0333107 A1* | 10/2021 | Syrstad | .................... | G06T 7/74 |
| 2021/0335000 A1* | 10/2021 | Kanetake | ............... | G06V 10/44 |
| 2022/0303468 A1* | 9/2022 | Murakami | ............ | H04N 23/69 |
| 2022/0398767 A1* | 12/2022 | Zheng | ................... | G06V 10/25 |

FOREIGN PATENT DOCUMENTS

| | | | | | |
|---|---|---|---|---|---|
| JP | 2014059792 A | 4/2014 | | | |
| JP | 2020115094 A | 7/2020 | | | |
| JP | 2022050929 A | 3/2022 | | | |
| WO | WO-2019026320 A1 * | 2/2019 | ........... | G06T 3/4038 |
| WO | WO-2021046578 A1 * | 3/2021 | ........... | G06V 10/764 |
| WO | WO-2021124319 A1 * | 6/2021 | ........... | G01B 21/042 |
| WO | WO-2024121668 A1 * | 6/2024 | .............. | G06T 7/80 |

* cited by examiner

F I G . 2 A
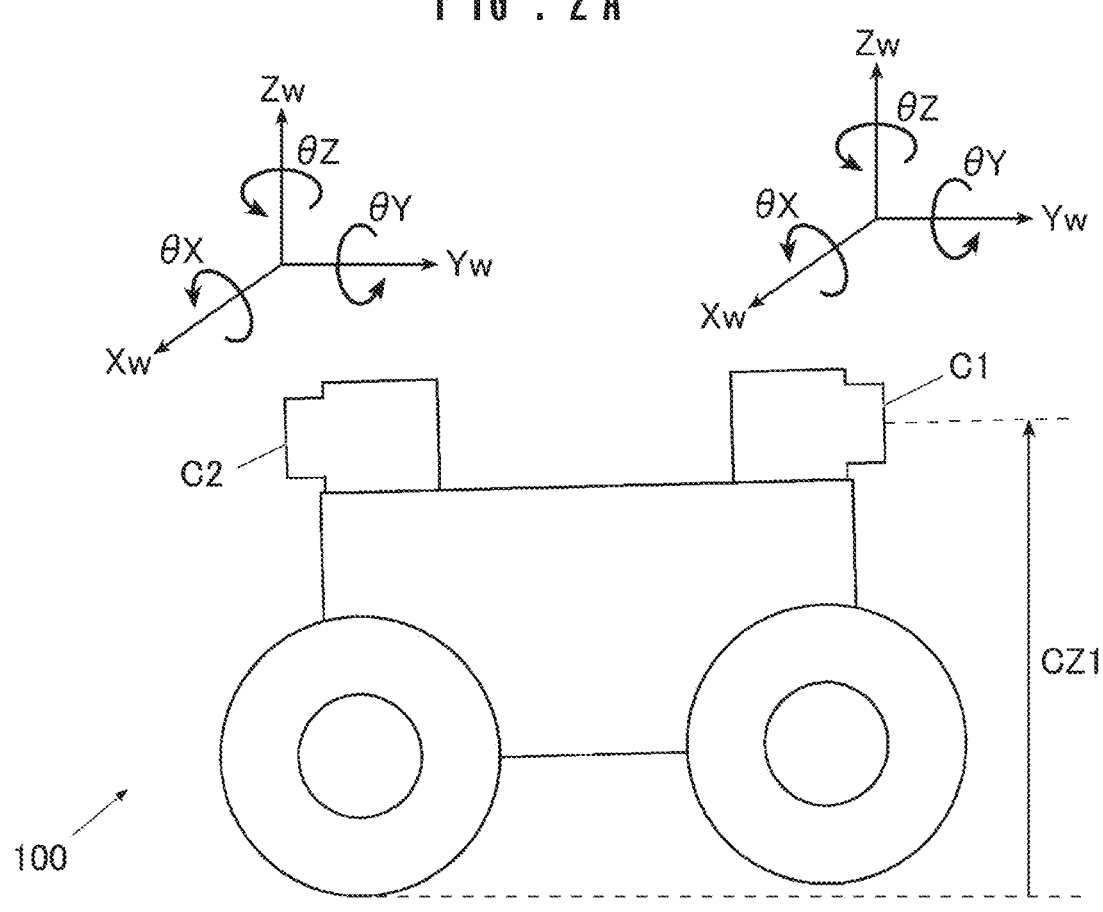
F I G . 2 B
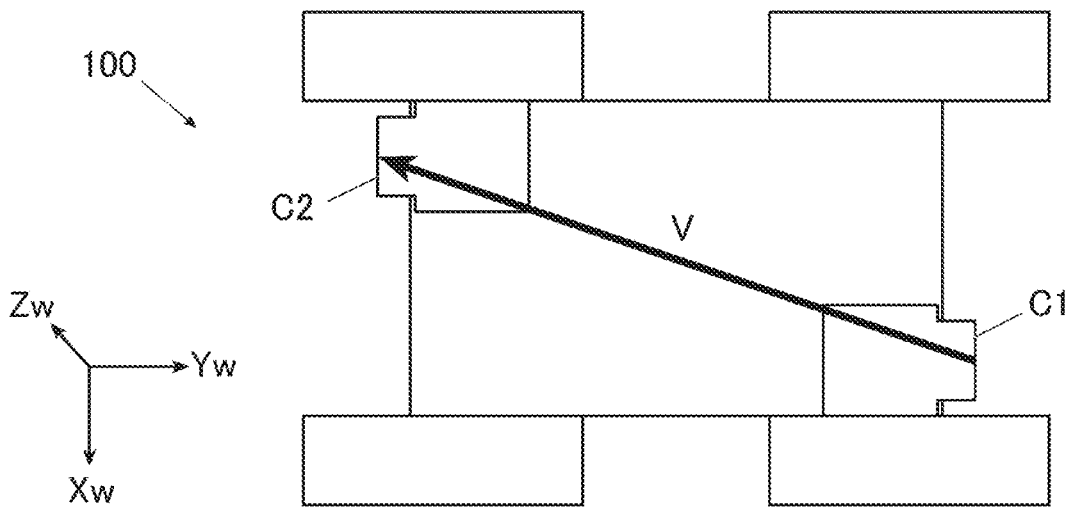

F I G . 4 A
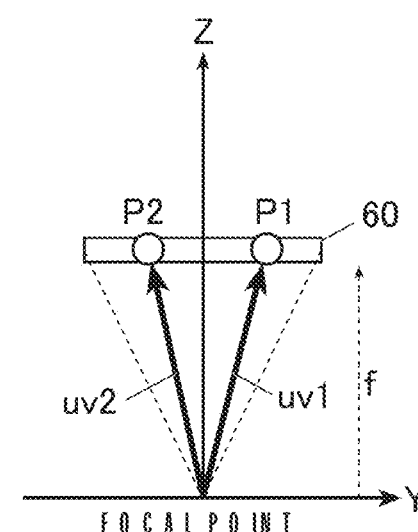
F I G . 4 B
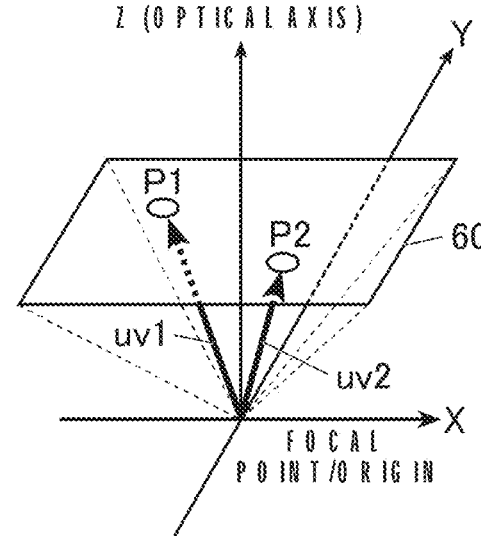
F I G . 4 C
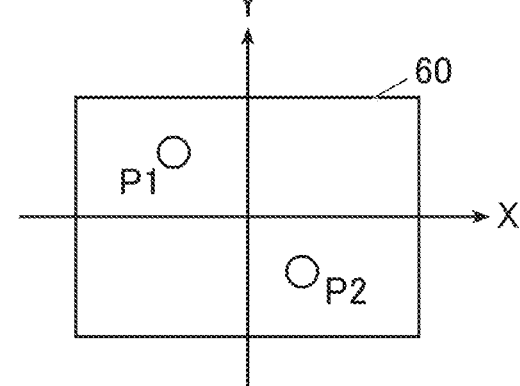

F I G . 5 A
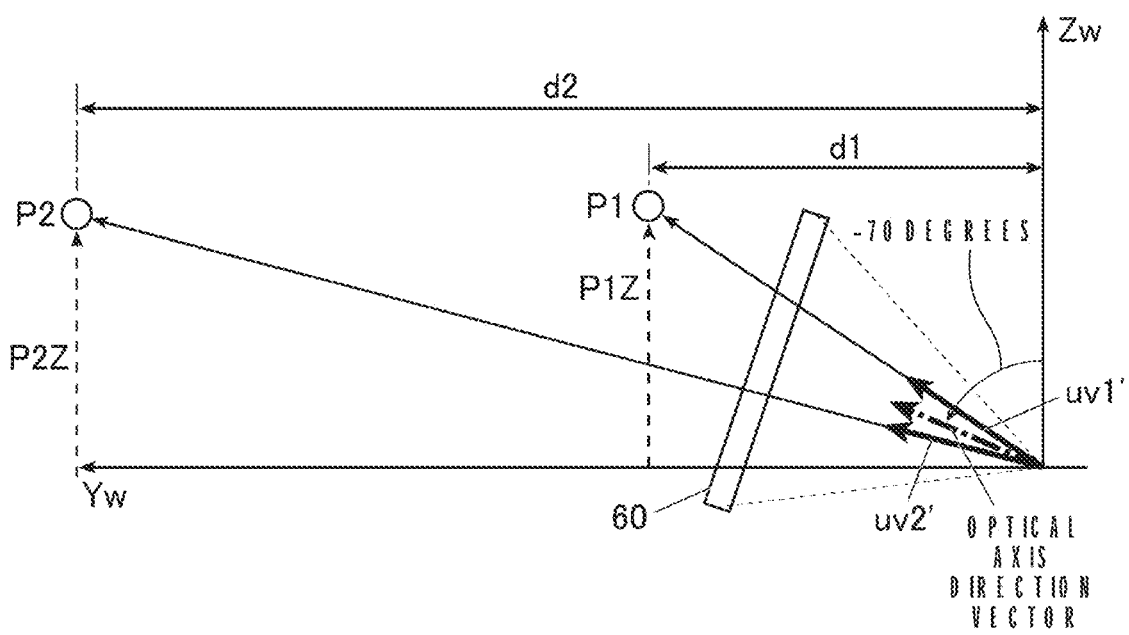
F I G . 5 B
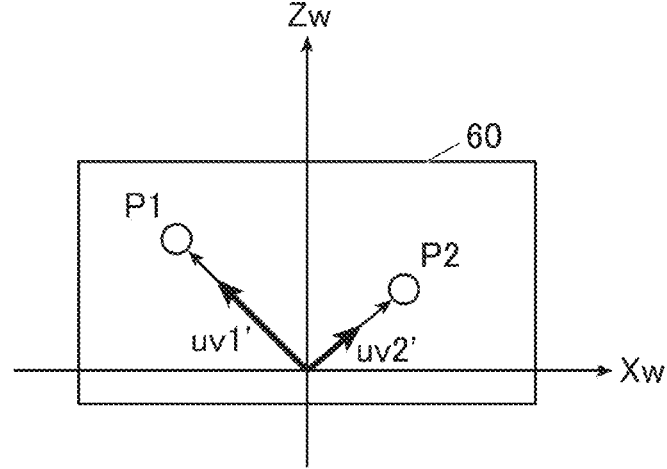

F I G . 6 A
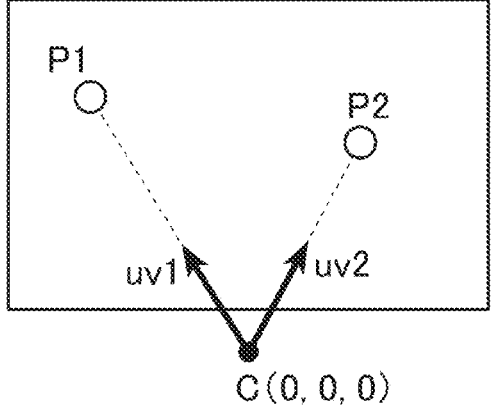
F I G . 6 B
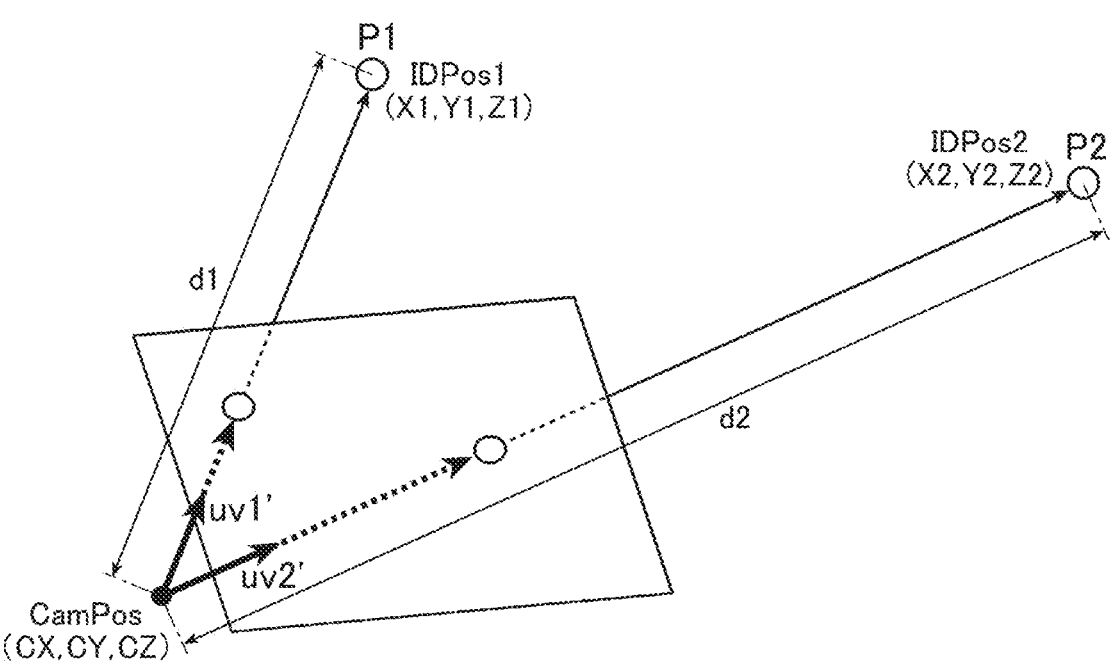

FIG. 7

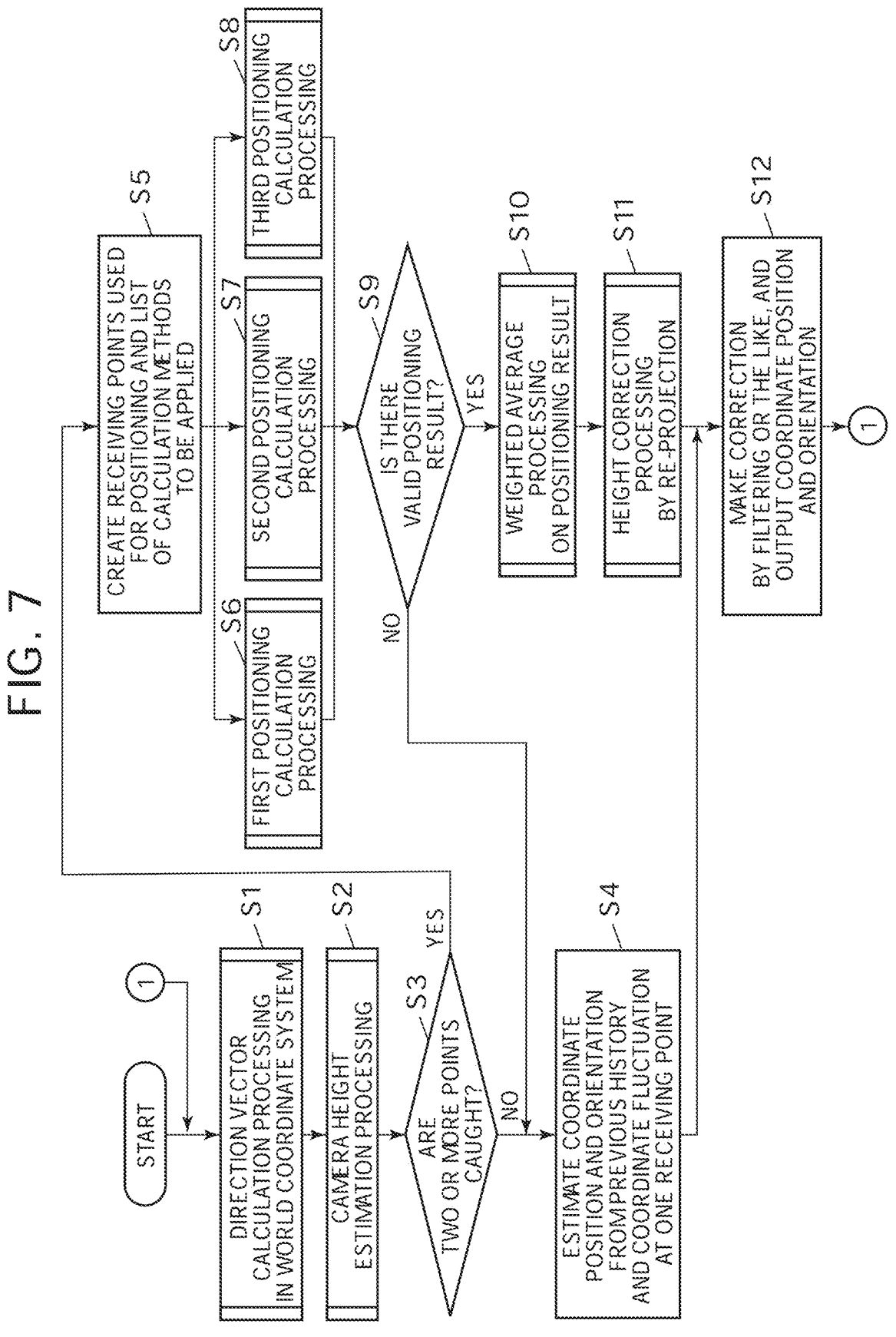

START

DIRECTION VECTOR CALCULATION PROCESSING IN WORLD COORDINATE SYSTEM — S1

CAMERA HEIGHT ESTIMATION PROCESSING — S2

ARE TWO OR MORE POINTS CAUGHT? — S3

YES

NO

ESTIMATE COORDINATE POSITION AND ORIENTATION FROM PREVIOUS HISTORY AND COORDINATE FLUCTUATION AT ONE RECEIVING POINT — S4

CREATE RECEIVING POINTS USED FOR POSITIONING AND LIST OF CALCULATION METHODS TO BE APPLIED — S5

FIRST POSITIONING CALCULATION PROCESSING — S6

SECOND POSITIONING CALCULATION PROCESSING — S7

THIRD POSITIONING CALCULATION PROCESSING — S8

IS THERE VALID POSITIONING RESULT? — S9

YES

NO

WEIGHTED AVERAGE PROCESSING ON POSITIONING RESULT — S10

HEIGHT CORRECTION PROCESSING BY RE-PROJECTION — S11

MAKE CORRECTION BY FILTERING OR THE LIKE, AND OUTPUT COORDINATE POSITION AND ORIENTATION — S12

1

CAMERA HEIGHT
ESTIMATION PROCESSING

S31
IS THERE HISTORY
OF POSITIONING
RESULTS?

NO

YES    S32
ADD AMOUNT OF CHANGE IN HEIGHT
LAST TIME AND TIME BEFORE LAST
TO PREVIOUS HEIGHT TO SET HEIGHT
AS CZ1

S33
SET DEFAULT INITIAL VALUE
AS CZ1

FIND HEIGHT CZ OF EACH CAMERA
FROM CZ1 AND INSTALLATION
VECTOR OF EACH CAMERA — S34

RETURN

C2

100

C1

V

CZ2

CZ1

F I G . 1 2 A
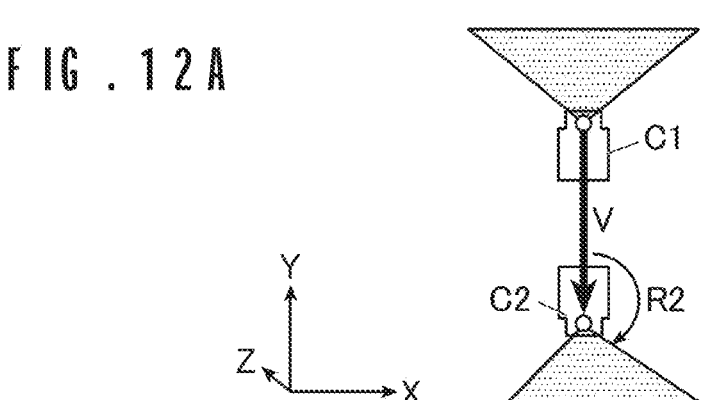
F I G . 1 2 B
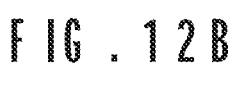
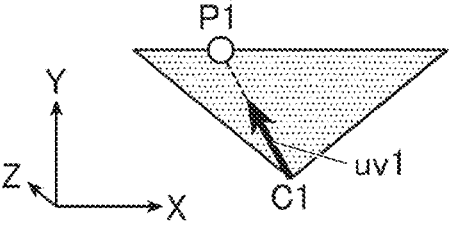
F I G . 1 2 C
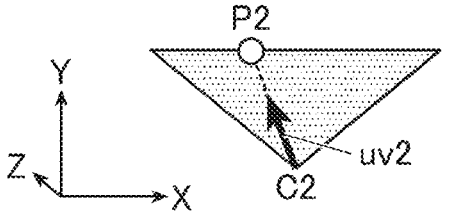
F I G . 1 2 D
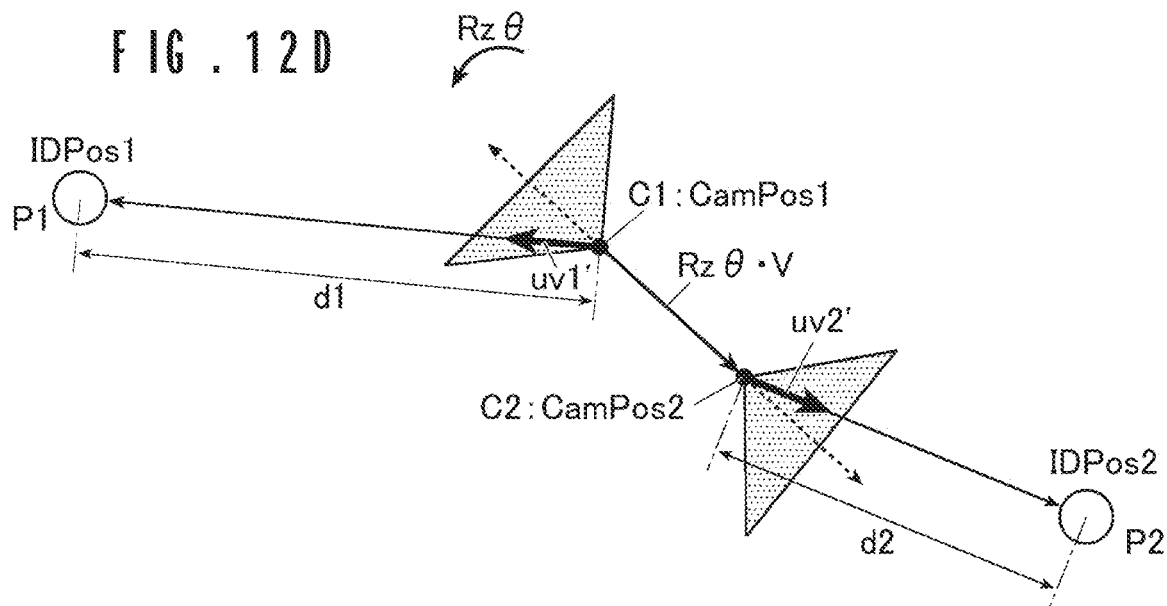

PROCESS OF FINDING ARC
FROM LATERAL PROSPECTIVE ANGLE

ACQUIRE LATERAL PROSPECTIVE ANGLE $\alpha$
BETWEEN TWO POINTS FROM LATERAL AZIMUTH
INSIDE ANGLES OF VIEW OF P1 AND P2 —— S41

FIND COORDINATES OF VERTEX E OF ISOSCELES
TRIANGLE WITH P1 AND P2 AS BASE AND HAVING
APEX ANGLE $\alpha$ —— S42

FIND CIRCLE PASSING THROUGH THREE POINTS
P1, P2, AND E TO SELECT ARC ON SIDE OF POINT E —— S43

END

FIG. 15

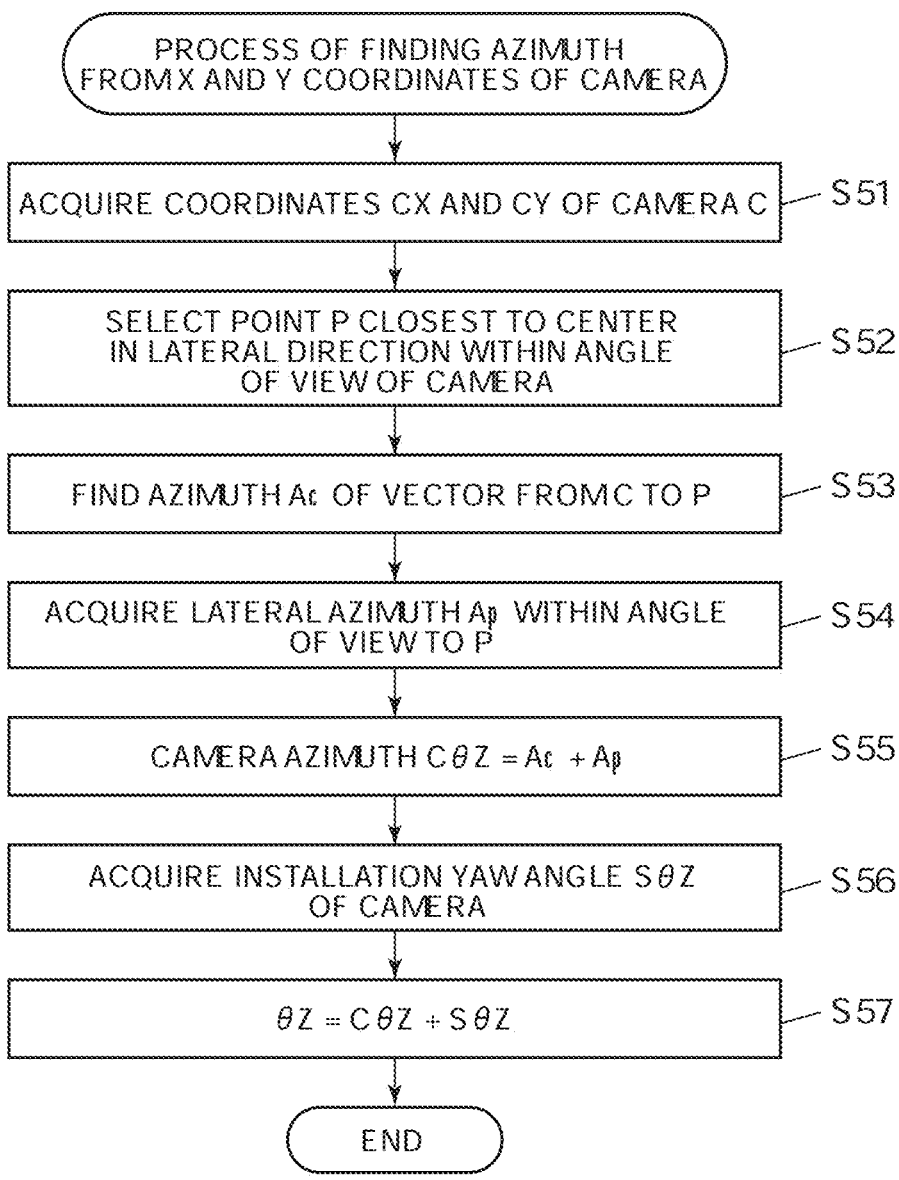

PROCESS OF FINDING AZIMUTH
FROM X AND Y COORDINATES OF CAMERA

ACQUIRE COORDINATES CX AND CY OF CAMERA C — S51

SELECT POINT P CLOSEST TO CENTER
IN LATERAL DIRECTION WITHIN ANGLE
OF VIEW OF CAMERA — S52

FIND AZIMUTH $A_c$ OF VECTOR FROM C TO P — S53

ACQUIRE LATERAL AZIMUTH $A_β$ WITHIN ANGLE
OF VIEW TO P — S54

CAMERA AZIMUTH $Cθ Z = A_c + A_β$ — S55

ACQUIRE INSTALLATION YAW ANGLE $Sθ Z$
OF CAMERA — S56

$θZ = Cθ Z + Sθ Z$ — S57

END

FIG. 17

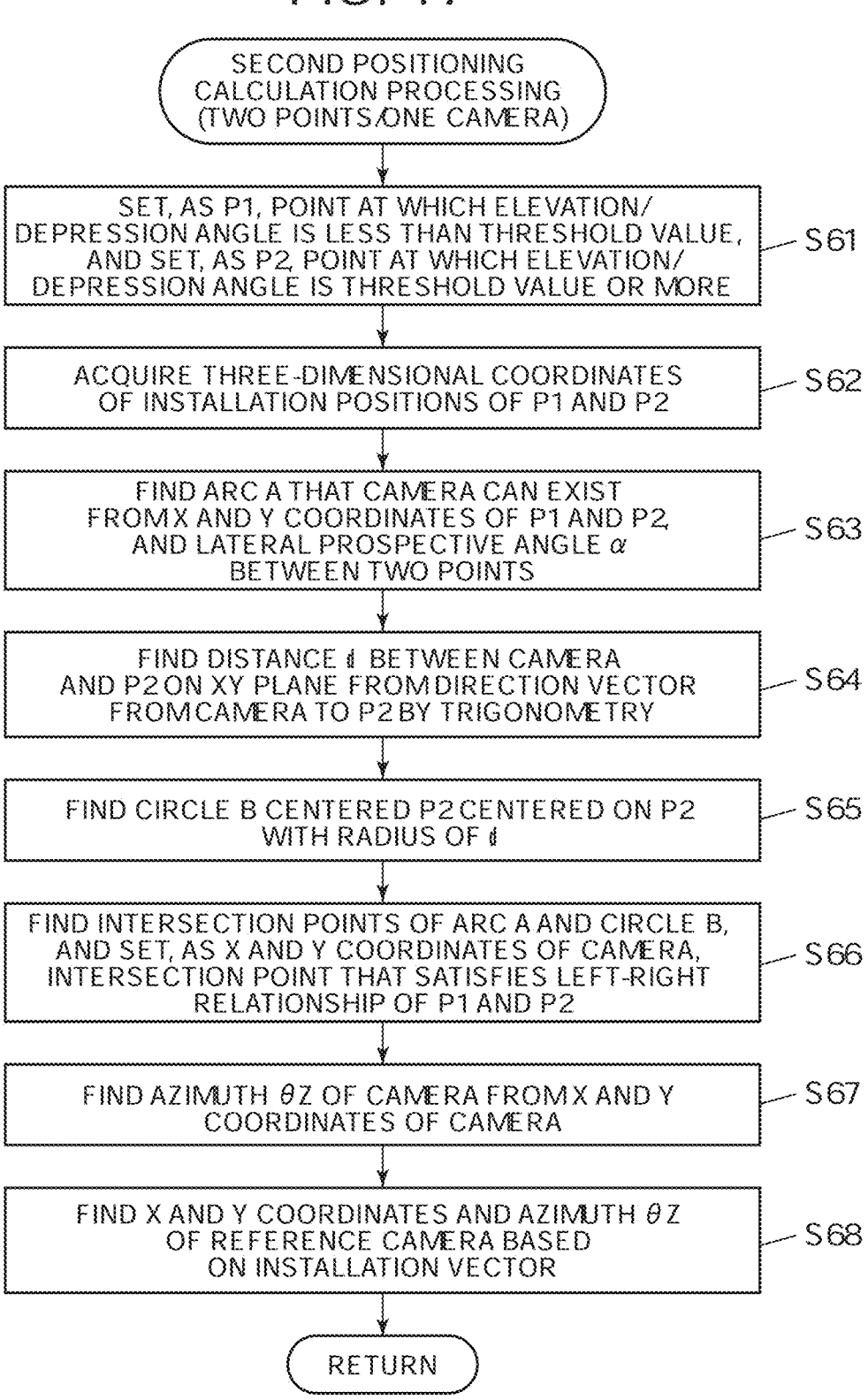

SECOND POSITIONING
CALCULATION PROCESSING
(TWO POINTS/ONE CAMERA)

SET, AS P1, POINT AT WHICH ELEVATION/
DEPRESSION ANGLE IS LESS THAN THRESHOLD VALUE,
AND SET, AS P2, POINT AT WHICH ELEVATION/
DEPRESSION ANGLE IS THRESHOLD VALUE OR MORE ⟋ S61

ACQUIRE THREE-DIMENSIONAL COORDINATES
OF INSTALLATION POSITIONS OF P1 AND P2 ⟋ S62

FIND ARC A THAT CAMERA CAN EXIST
FROM X AND Y COORDINATES OF P1 AND P2,
AND LATERAL PROSPECTIVE ANGLE $\alpha$
BETWEEN TWO POINTS ⟋ S63

FIND DISTANCE $l$ BETWEEN CAMERA
AND P2 ON XY PLANE FROM DIRECTION VECTOR
FROM CAMERA TO P2 BY TRIGONOMETRY ⟋ S64

FIND CIRCLE B CENTERED P2 CENTERED ON P2
WITH RADIUS OF $l$ ⟋ S65

FIND INTERSECTION POINTS OF ARC A AND CIRCLE B,
AND SET, AS X AND Y COORDINATES OF CAMERA,
INTERSECTION POINT THAT SATISFIES LEFT-RIGHT
RELATIONSHIP OF P1 AND P2 ⟋ S66

FIND AZIMUTH $\theta Z$ OF CAMERA FROM X AND Y
COORDINATES OF CAMERA ⟋ S67

FIND X AND Y COORDINATES AND AZIMUTH $\theta Z$
OF REFERENCE CAMERA BASED
ON INSTALLATION VECTOR ⟋ S68

RETURN

CAMERA IMAGE

ON XwYw PLANE

F I G . 2 0 A
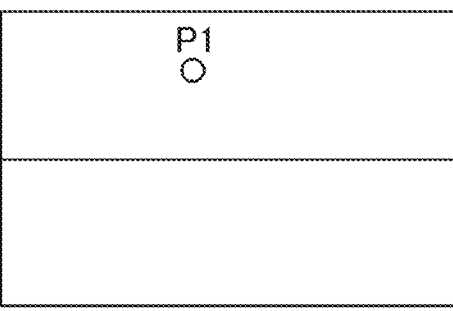
C a IMAGE
F I G . 2 0 B
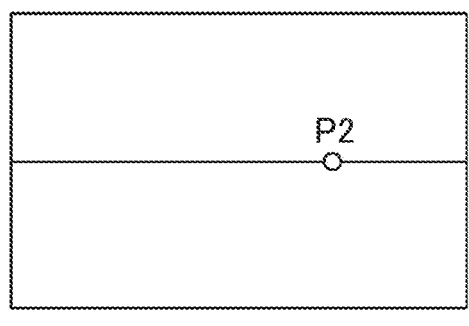
C b IMAGE
F I G . 2 0 C
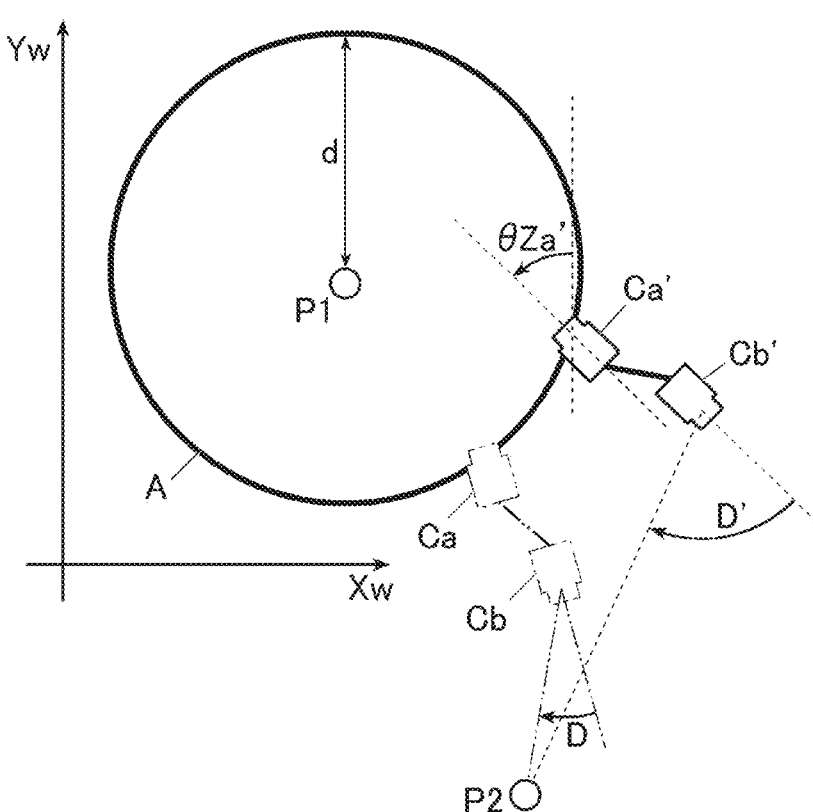

FIG. 21

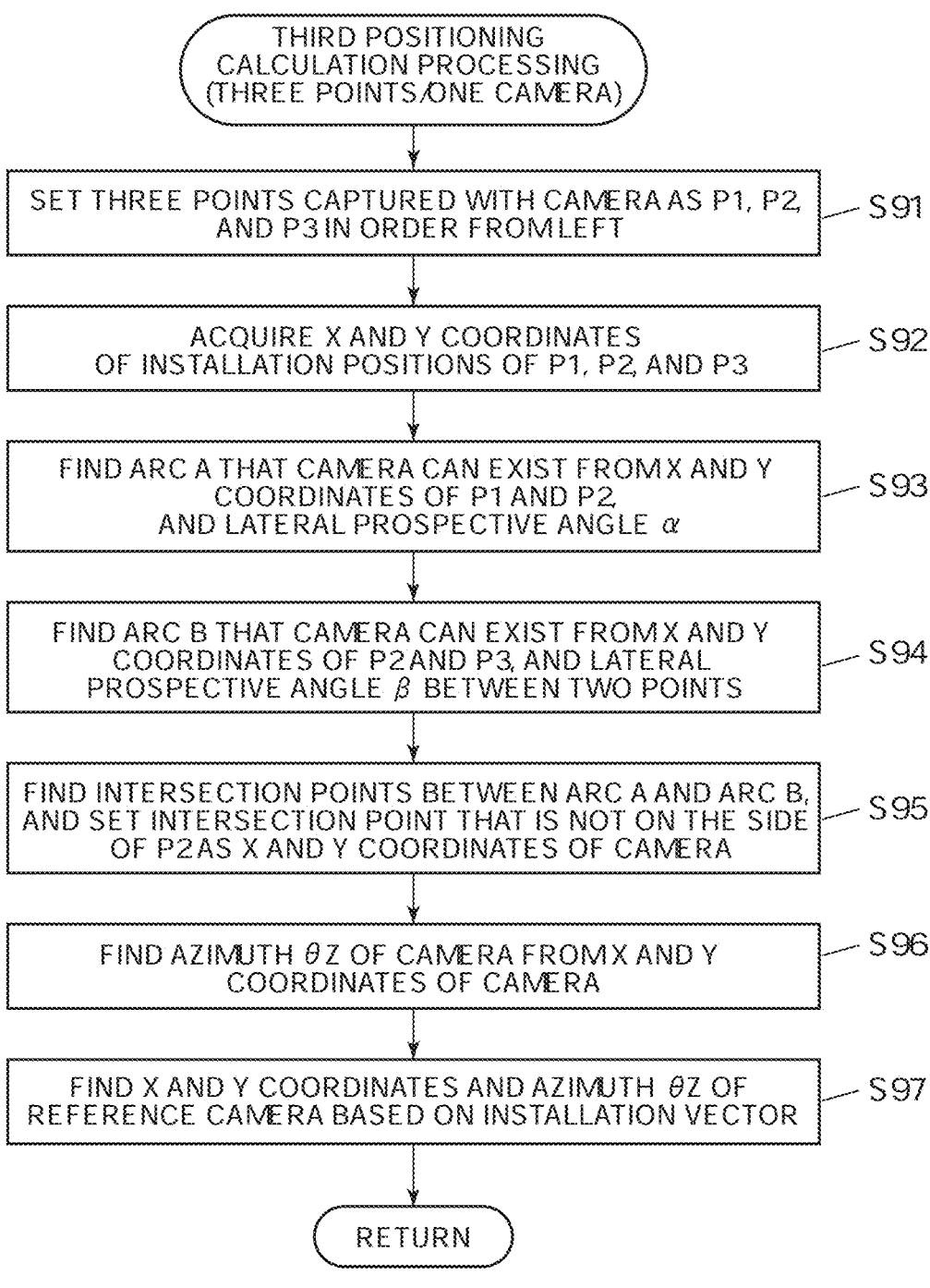

THIRD POSITIONING
CALCULATION PROCESSING
(THREE POINTS/ONE CAMERA)

SET THREE POINTS CAPTURED WITH CAMERA AS P1, P2, AND P3 IN ORDER FROM LEFT — S91

ACQUIRE X AND Y COORDINATES OF INSTALLATION POSITIONS OF P1, P2, AND P3 — S92

FIND ARC A THAT CAMERA CAN EXIST FROM X AND Y COORDINATES OF P1 AND P2 AND LATERAL PROSPECTIVE ANGLE $\alpha$ — S93

FIND ARC B THAT CAMERA CAN EXIST FROM X AND Y COORDINATES OF P2 AND P3, AND LATERAL PROSPECTIVE ANGLE $\beta$ BETWEEN TWO POINTS — S94

FIND INTERSECTION POINTS BETWEEN ARC A AND ARC B, AND SET INTERSECTION POINT THAT IS NOT ON THE SIDE OF P2 AS X AND Y COORDINATES OF CAMERA — S95

FIND AZIMUTH $\theta Z$ OF CAMERA FROM X AND Y COORDINATES OF CAMERA — S96

FIND X AND Y COORDINATES AND AZIMUTH $\theta Z$ OF REFERENCE CAMERA BASED ON INSTALLATION VECTOR — S97

RETURN

F I G . 2 2 A
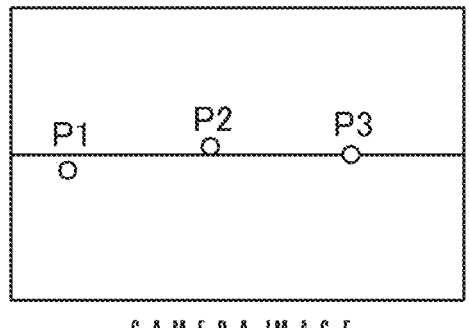
C A M E R A   I M A G E
F I G . 2 2 B
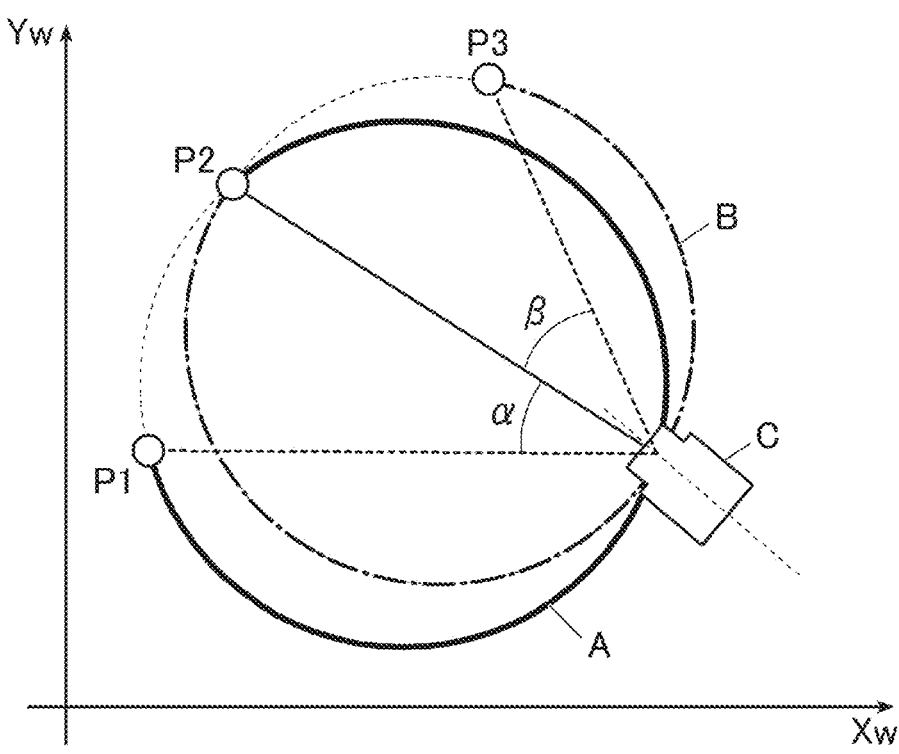

Ca IMAGE

Cb IMAGE

FIG. 25

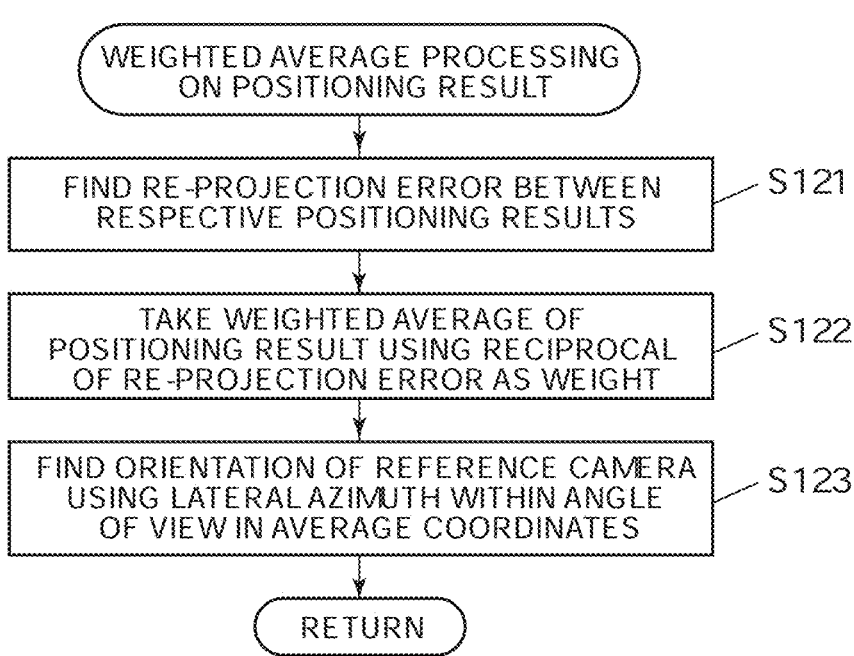

WEIGHTED AVERAGE PROCESSING
ON POSITIONING RESULT

FIND RE-PROJECTION ERROR BETWEEN
RESPECTIVE POSITIONING RESULTS — S121

TAKE WEIGHTED AVERAGE OF
POSITIONING RESULT USING RECIPROCAL
OF RE-PROJECTION ERROR AS WEIGHT — S122

FIND ORIENTATION OF REFERENCE CAMERA
USING LATERAL AZIMUTH WITHIN ANGLE
OF VIEW IN AVERAGE COORDINATES — S123

RETURN

FIG. 26

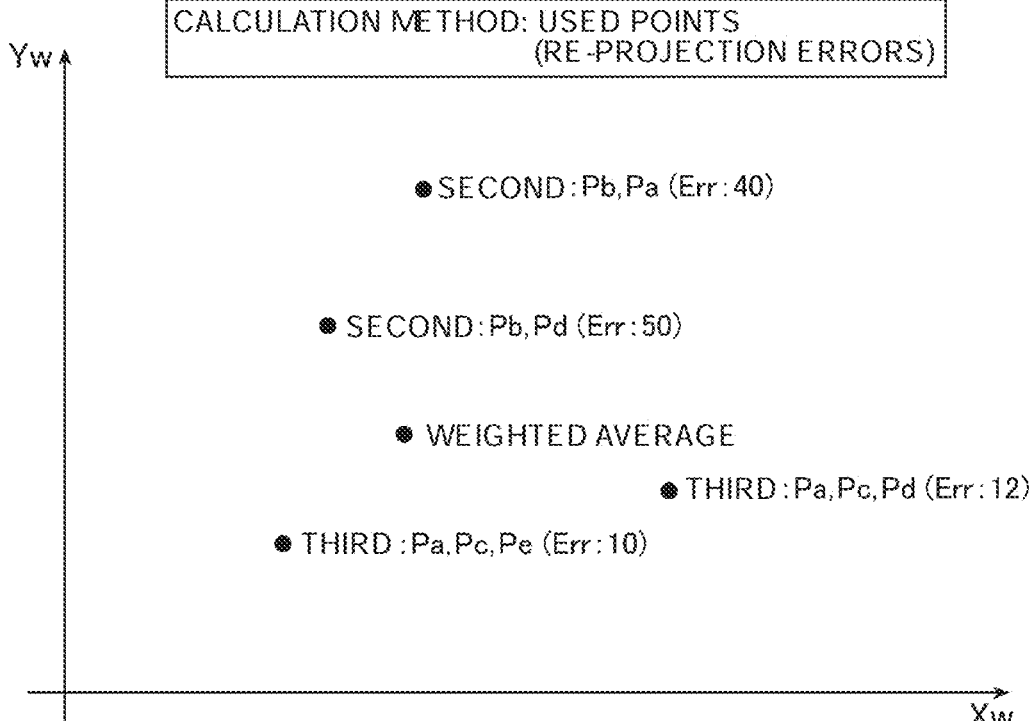

CALCULATION METHOD: USED POINTS
(RE-PROJECTION ERRORS)

$Y_w$

● SECOND : Pb, Pa (Err : 40)

● SECOND : Pb, Pd (Err : 50)

● WEIGHTED AVERAGE

● THIRD : Pa, Pc, Pd (Err : 12)

● THIRD : Pa, Pc, Pe (Err : 10)

$X_w$

INFORMATION PROCESSING APPARATUS, INFORMATION PROCESSING METHOD, AND RECORDING MEDIUM

CROSS-REFERENCE TO RELATED APPLICATION

This application is based upon and claims the benefit of priority from Japanese Patent Application No. 2023-158279, filed on Sep. 22, 2023, the entire specification, claims, and drawings thereof are incorporated herein by reference.

BACKGROUND OF THE INVENTION

1. Field of the Invention

The present invention relates to an information processing device, an information processing method, and a recording medium.

2. Related Art

Various positioning systems are conventionally used for self-position estimation.

For example, a technique has been proposed to estimate the position of a moving body (for example, Japanese Unexamined Patent Application Publication No. 2022-050929), where multiple light-emitting devices (position indicators), each of which transmits an ID capable of uniquely identifying itself by visible light communication (three-color pattern of RGB, or the like), are captured with a camera equipped in the moving body.

SUMMARY OF THE INVENTION

In order to solve the above problem, an information processing apparatus of the present invention includes a control unit which acquires a first coordinate position inside an image of each light source included in an image captured with an imaging device among a plurality of light sources whose coordinate positions in a three-dimensional space are known to perform positioning processing to derive at least either of a coordinate position and an orientation of an own device in the three-dimensional space based on a coordinate position of the light source included in the image in the three-dimensional space and the first coordinate position, wherein the control unit estimates a height of the imaging device in the three-dimensional space, the control unit uses information on the estimated height of the imaging device to perform the positioning processing, the control unit acquires a second coordinate position of the light source on the image corresponding to the positioning processing result, and the control unit corrects the height of the imaging device based on the first coordinate position and the second coordinate position.

BRIEF DESCRIPTION OF THE DRAWINGS

FIG. 2A is a diagram illustrating attitude angles of cameras in a world coordinate system.

FIG. 2B is a diagram for describing a relative positional relationship of two cameras.

FIG. 4A is a diagram illustrating an example of how position indicators look like in a camera coordinate system.

FIG. 4B is a diagram illustrating the example of how the position indicators look like in the camera coordinate system.

FIG. 4C is a diagram illustrating the example of how the position indicators look like in the camera coordinate system.

FIG. 5A is a diagram illustrating an example in which the camera coordinate system is converted to a relative world coordinate system centered around a camera.

FIG. 5B is a diagram illustrating the example in which the camera coordinate system is converted to the relative world coordinate system centered around the camera.

FIG. 6A is a diagram illustrating three-dimensional unit direction vectors from a camera to position indicators in the camera coordinate system.

FIG. 6B is a diagram illustrating a coordinate position of the camera in the world coordinate system, and coordinate positions of the respective position indicators.

FIG. 7 is a flowchart illustrating overall processing executed in the moving body.

FIG. 12A is diagram illustrating an example of the positional relationship between two cameras.

FIG. 12B is a diagram illustrating a unit direction vector to a position indicator in the camera coordinate system of a camera.

FIG. 12C is a diagram illustrating a unit direction vector to another position indicator in the camera coordinate system of another camera.

FIG. 12D is a diagram illustrating coordinate positions of the respective cameras and coordinate positions of the respective position indicators in the world coordinate system.

FIG. 15 is a flowchart illustrating processing of finding an azimuth from the X and Y coordinates of a camera.

FIG. 17 is a flowchart illustrating second positioning calculation processing when two points are captured with the same camera.

FIG. 20A illustrates an example of a captured image captured with a camera.

FIG. 20B illustrates a captured image captured with another camera.

FIG. 20C is a diagram in which the respective position indicators and the respective cameras are projected on the XY plane in the world coordinate system.

FIG. 21 is a flowchart illustrating third positioning calculation processing when three points are captured with the same camera.

FIG. 22A illustrates an example of a captured image captured with a certain camera.

FIG. 22B is a diagram in which respective position indicators and the camera are projected on the XY plane in the world coordinate system.

FIG. 25 is a flowchart illustrating weighted average processing on a positioning result.

FIG. 26 is an image diagram of weighted averages of positioning results.

DESCRIPTION OF THE PREFERRED
EMBODIMENTS

An embodiment of an information processing apparatus according to the present invention will be described with reference to the accompanying drawings. Note that the present invention is not limited to the illustrated example. [Configuration of Positioning System]

Figure 1:
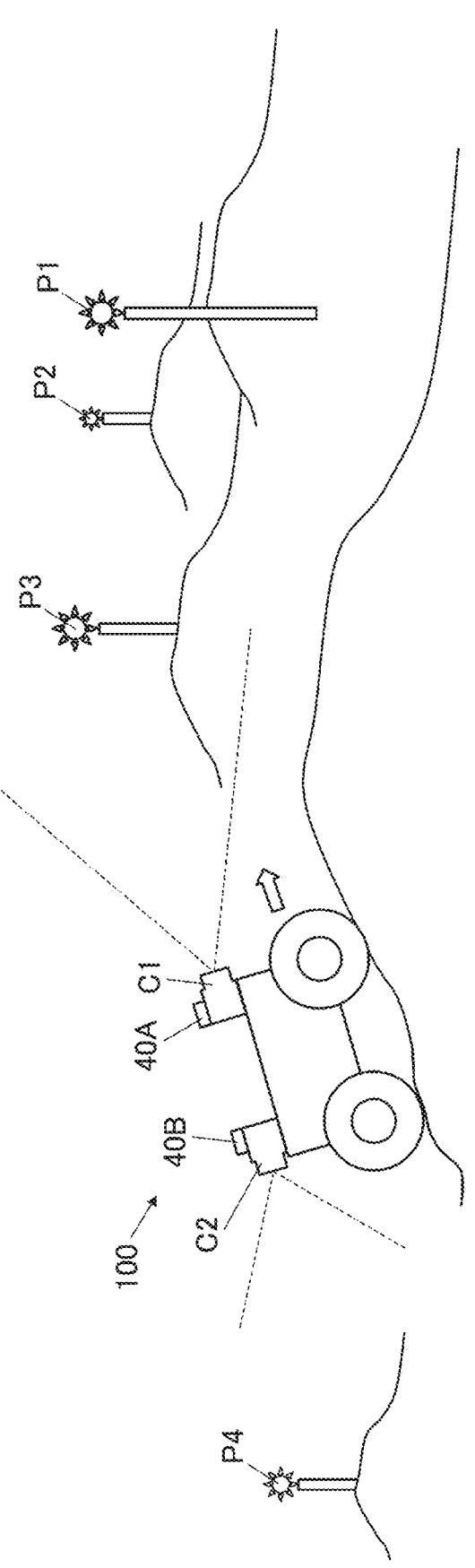
FIG. 1 is a diagram illustrating the configuration of a positioning system in an embodiment of the present invention.

FIG. 1 is a diagram illustrating the configuration of a positioning system 1 in the present embodiment. The positioning system 1 is composed of a moving body 100 and multiple position indicators P1, P2, P3, P4, . . . . In the following, when not distinguishing among the position indicators P1, P2, P3, P4, . . . , each of which is called a "position indicator P." The positioning system 1 is expected to be used on the lunar surface as one of optimal application locations.

In the present embodiment, an information processing apparatus according to the present invention is equipped in the moving body 100. Here, a lunar rover is assumed as the moving body 100, but the moving body 100 may also be an autonomous driving rover or robot, a rover piloted by humans (including an automatic driving mode), mobile construction equipment, or the like.

Cameras C1 and C2 used for receiving visible light communication are attached to the moving body 100. The three-dimensional position and orientation of the moving body 100 is derived by capturing position indicators P in images captured with the cameras C1 and C2.

In the present embodiment, the moving body 100 acquires information related to visible light communication using the two front and rear cameras of the camera C1 facing forward in the direction that the moving body 100 is moving, and the camera C2 facing backward. The reasons for using the two front and rear cameras are to ensure the detection range of visible light communication, and to reduce correction errors in optical distortion of a lens or the like. Note that if distortion correction is performed well, a single camera with a large wide-angle lens may also be used. In the following, when not distinguishing between the cameras C1 and C2, each camera is called the "camera C."

An attitude angle sensor 40A is provided in the camera C1. The attitude angle sensor 40A outputs a pitch angle and a roll angle of the camera C1.

An attitude angle sensor 40B is provided in the camera C2. The attitude angle sensor 40B outputs a pitch angle and a roll angle of the camera C2. In the following, when not distinguishing between the attitude angle sensors 40A and 40B, each attitude angle sensor is called the "attitude angle sensor 40."

FIG. 2A illustrates attitude angles $\theta X$, $\theta Y$, and $\theta Z$ of the cameras C1 and C2 in a world coordinate system. As an initial setting value, an installation yaw angle $\theta Z$ of each of the cameras C1 and C2 installed in the moving body 100 is measured by taking the travel direction of the moving body 100 as an orientation of 0. In the case of typical two front and rear cameras, the installation azimuth of the camera C1 becomes 0 degrees and the installation azimuth of the camera C2 becomes 180 degrees.

Note that the camera C1, C2 may also be written as a camera C. Further, the coordinate position of the camera C may also be written as CX, CY, and CZ, and the attitude angle thereof may also be written as $\theta X$, $\theta Y$, and $\theta Z$.

A three-dimensional coordinate position CZ1 of the camera C1 becomes the height of the camera C1.

Further, as illustrated in FIG. 2B, an installation vector V indicative of the position of the camera C2 relative to the camera C1 (reference camera) as a positioning reference is set to indicate a relative positional relationship between the camera C1 and the camera C2.

Thus, when multiple cameras C are installed, relative differences in spatial position and attitude angle between any two cameras C can be found.

Note that the height of the camera C1 at the time of installation and the initial value of the ground height are set 0 m as a tentative camera height. In order to improve accuracy from the initial state, it will be desirable to set the initial height if the conditions are known in advance.

On the lunar surface as the operating area of the moving body 100, position indicators P as multiple light sources are installed at very wide intervals.

Each position indicator P includes an LED (Light Emitting Diode). The position indicator P controls light emission or reflection by color modulation or brightness modulation in the visible light wavelength range and transmits information as a transmission target. For example, the position indicator P transmits at least identification information unique to the position indicator P (a light source ID capable of uniquely identifying itself) by the three-color pattern of R (red), G (green), and B (blue). At the time of installation, the installation positions (three-dimensional coordinates) of the multiple position indicators P in the world coordinate system (Xw, Yw, Zw) are measured. The correspondence between the light source ID and the three-dimensional coordinates of each position indicator P is stored in a light source ID-3D coordinate table 21 (see FIG. 3) inside the moving body 100. Note that, when the communication capacity is sufficient, the position indicator P may also transmit own installation position coordinate information to eliminate the need to create and refer to the table.

The position indicator P is placed at a sufficient height to be visible from a long distance beyond the undulations of the lunar surface or placed in a raised area (in a high-altitude area).

As a power source of the position indicator P, solar cells or the like are used. When the position indicator P is operated even during the night period of the moon (during a period facing away from the sun), it is assumed that the position indicator P has a large capacity charging mechanism corresponding to the period.

[Configuration of Moving Body]

Figure 3:
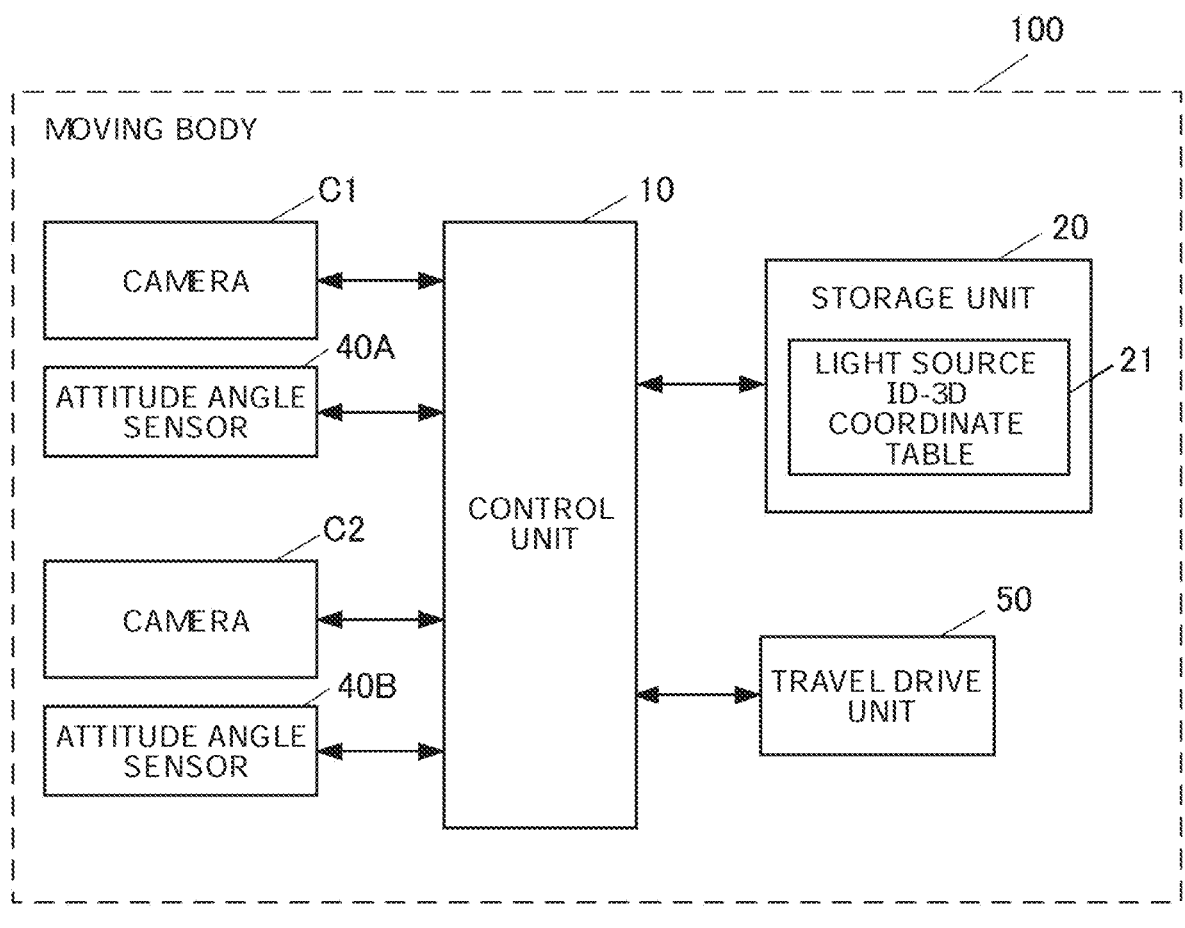
FIG. 3 is a configuration diagram of a moving body.

FIG. 3 is a configuration example of the moving body 100. As illustrated in FIG. 3, the moving body 100 includes a control unit 10, a storage unit 20, the cameras C (C1, C2), the attitude angle sensors 40 (40A, 40B), a travel drive unit 50, and the like.

The control unit 10 is configured by a CPU (Central Processing Unit). The control unit 10 controls each unit of the moving body 100 according to a program stored in the storage unit 20.

The storage unit 20 stores a program executed by the control unit 10, various setting data, and the like. The program is stored in the storage unit 20 in the form of computer readable program code. As the storage unit 20, an HDD (Hard Disk Drive), an SSD (Solid State Drive), or the like is used.

The light source ID-3D coordinate table 21 is stored in storage unit 20.

In the light source ID-3D coordinate table 21, the light source ID of each position indicator P and the three-dimensional coordinates as the installation position of the position indicator P are associated with each other for the multiple position indicators P, respectively. The light source ID-3D coordinate table 21 is used in positioning processing by visible light communication.

The camera C captures an optical image that enters through a lens to generate two-dimensional image data. The camera C performs imaging consecutively in time, and outputs continuous image data to the control unit 10.

The attitude angle sensor 40 is a known two-axis attitude angle sensor, which outputs, to the control unit 10, the pitch angle and the roll angle of the camera C corresponding to the attitude angle sensor 40.

The travel drive unit 50 drives the wheels to make the moving body 100 travel, changes the moving direction of the moving body 100, and the like. The travel drive unit 50 moves the moving body 100.

The control unit 10 analyzes the image data continuously captured with the camera C to detect the light source ID indicated by visible light communication from each light-emitting point (position indicator P) included in the captured images.

The control unit 10 acquires a pair of the light source ID of each light-emitting point on each captured image and the coordinate position of the light-emitting point on the captured image (on the two-dimensional plane).

The control unit 10 performs positioning processing of the moving body 100 (camera C) about each light source ID received by visible light communication based on the coordinate position on the captured image and a known three-dimensional position (the installation position of the position indicator P).

[Overview of Positioning Method Using Camera Visible Light Communication]

The inventors have proposed a positioning method using camera visible light communication so far. In this method, it is assumed that the attitude angles θX and θY (pitch and roll) of the camera C and the camera height CZ are known (fixed or determined in advance) among six degrees of freedom of the camera C (the coordinates CX, CY, CZ, and the attitude angles θX, θY, θZ). Then, the coordinates CX, CY and the orientation θZ of the camera C as remaining three degrees of freedom are found as unknown quantities. Even in the present invention, similar assumptions are taken. However, although the height CZ is determined prior to the positioning calculation, since the height CZ is updated sequentially, the output of positioning result is four degrees of freedom (CX, CY, CZ, θZ). Note that in this system, since the camera attitude angles θX and θY are sequentially observed by the attitude angle sensor 40 to make the camera attitude angles θX and θY known, output is six degrees of freedom in the whole system.

FIG. 4A, FIG. 4B, and FIG. 4C illustrate an example of how the position indicators P1 and P2 look like in a camera coordinate system. It is assumed that the camera focus position is the origin of the camera coordinate system and the optical axis direction is the Z-axis direction. It is considered that a perspective projection plane 60 of an erect image of an image plane on the negative side of the Z axis (inverted image) is in a position of a focal length f of the camera from the origin toward the positive side of the Z axis. FIG. 4C is a projection view onto an XY plane in the camera coordinate system viewed from the negative side of the Z axis, which is equivalent to the image coordinate system.

The focal length f and one pixel size of the camera are set to be known to find a three-dimensional unit direction vector uv (uv1 or uv2) in the camera coordinate system from a camera focal point toward one coordinate point (the position of the position indicator P1 or P2) on the image plane.

This three-dimensional unit direction vector uv is converted to a direction vector toward each position indicator P based on the camera standards in the world coordinate system and the distance to the position indicator P.

In FIG. 5A and FIG. 5B, an example in which the camera coordinate system illustrated in FIG. 4A, FIG. 4B, and FIG. 4C is converted to a relative world coordinate system centered around the camera. Here, it is assumed that (θX, θY, θZ)=(−70 degrees, 0 degrees, 0 degrees). The distances from the origin (the position of the camera) to the position indicators P1 and P2 on the XY plane are called d1 and d2, respectively. FIG. 5A is a ZY plane projection (d1 and d2 are ZY projected) when a camera-centered relative world coordinate system is viewed from the negative side of the X axis.

A three-dimensional rotation matrix determined from the attitude angles θX and θY (known) of the camera C is applied to the three-dimensional unit direction vector uv to find a unit vector uv' of the three-dimensional direction vector in the world coordinate system (hereinafter also called the "unit direction vector"). Although the Z-axis rotation is set to 0 (the orientation is indeterminate), the unit direction vector uv' is a direction vector that reflects the pitch angle and the roll angle of the camera C.

In FIG. 6A, three-dimensional unit direction vectors uv1 and uv2 from the camera C to the position indicators P1 and P2 in the camera coordinate system are illustrated.

In FIG. 6B, a coordinate position CamPos of the camera C in the world coordinate system, a coordinate position IDPos1 of the position indicator P1, and a coordinate position IDPos2 of the position indicator P2 are illustrated.

A vector obtained by multiplying the three-dimensional unit direction vector uv by a rotation matrix (Rzθ) representing an azimuth θZ to be found and further by a distance d between the camera C and the position indicator P is translated to the coordinate position CamPos (CX, CY, CZ) (CZ is known) in which the camera C exists (vector addition).

The resulting vector matches a vector from the coordinate position Campos of the camera C to the coordinate position IDPos of the position indicator P. In other words, the following equation (1) is obtained as the reception result of one position indicator P:

$$(Rz\theta \cdot uv) * d + CamPos = IDPos - CamPos \qquad \text{Equation (1)}$$

When a matrix is expanded using equation (1), three linear equations are obtained. Three equations are obtained at one point (position indicator P), and a distance d between the camera C and the position indicator P is introduced as a new variable.

Here, the azimuth θZ is represented by a three-dimensional rotation matrix having only a Z-axis rotation component corresponding to the azimuth on the plane. In this three-dimensional rotation matrix Rzθ, terms of cos θZ and sin θZ are contained. When cos θZ and sin θZ are found, θZ is found from a trigonometric formula.

In equation (1), unknown parameters are four parameters of CX, CY, cos θZ, and sin θZ, and respective distances d newly appearing each time an equation is formulated (every number of position indicators).

The minimum condition to solve this simultaneous equation is that the number of equations (3×N) of received N pieces of information on the position indicator P is the number of unknown parameters (4+1×N) or more. The minimum value of N that satisfies this condition is two. In other words, when position indicators P at two points are viewed, the following two determinants of simultaneous equations are obtained.

$$Rz\theta \cdot uv1 * d1 + CamPos = IDPos1 - CamPos \qquad \text{Equation (2)}$$

$$Rz\theta \cdot uv2 * d2 + CamPos = IDPos2 - CamPos \qquad \text{Equation (3)}$$

When matrices are expanded in equation (2) and equation (3) mentioned above, the matrices become simultaneous equations consisting of six equations. Since unknown parameters are six, that is, CX, CY, cos θZ, sin θZ, d1, and d2, the simultaneous equations are guaranteed to be solved analytically as linear equations. Since the simultaneous equations have only to be solved, no external parameters such as observation data of previous states are required in the calculations, and global positioning (one-shot positioning) is possible.

[Problems with Previous Positioning Method]

As mentioned above, the positioning method using camera visible light communication with some degrees of freedom made to be known has the advantage of being able to minimize the number of position indicators P to be observed.

However, in an off-load environment on the assumption of position indicators P installed over a wide area (in which the height of the camera C changes), positioning may be difficult.

For positioning in a wide area such as on the lunar surface, each position indicator P is often visible far away near the horizon. In such a case, the elevation/depression angle becomes extremely small value. In other words, the position indicator P in images captured with the camera C can be widely dispersed in the lateral direction (horizontal direction), but the dispersion is considered to be small in the longitudinal direction (height/depth direction).

Note that the elevation angle is an angle between a line of sight direction when looking up and the horizontal plane. The depression angle is an angle between the line of sight direction when looking down and the horizontal plane. Here, the elevation angle and the depression angle as prospective angles in the longitudinal direction (vertical direction/up and down direction) are represented as the "elevation/depression angle" together. When the camera C is below the installation height of the position indicator P, the angle is the elevation angle, while when the camera C is above the installation height of the position indicator P, the angle is the depression angle.

For example, even in a case where the height of the position indicator P increases, for example, on the assumption of observation from a distance, when the moving body 100 such as a lunar rover climes a hill on the lunar surface, the installation height of the position indicator P and the height of the moving body 100 (camera C) may almost match each other.

In equation (1) mentioned above, when the coordinate position CamPos of the camera C and the Z coordinate of the coordinate position IDPos of the position indicator P are the same, the Z component of the direction vector from the camera C to the position indicator P is zero, which becomes the same as that there is no information caused by the slope of the vector. In this case, since the term related to Z is algebraically simplified to lower the determinant by one rank, the number of equations obtained by capturing images of one position indicator P is two, a general linear system of simultaneous equations indicated by equation (1) cannot be solved by two-point observation information.

Further, in a case where the elevation/depression angle is small when the position indicator P is viewed from the camera C, errors in distance from the camera C to the position indicator P and positioning result of the camera C increase. For example, when the difference in height between the camera C and the position indicator P is 10 m, and the distance between the camera C and the position indicator P is 652 m, the error in distance to the position indicator P can be 300 m or more even though the elevation/depression angle is different by one degrees. Therefore, the positioning position of the camera C can be shifted by 400 m or more, and the error in the orientation of the camera C can also be 10 degrees or more.

Thus, there are problems that use of information on the Z direction of the vector to the position indicator P results in an increased error in positioning calculations even when the elevation/depression angle to the position indicator P is minute, and that the positioning calculations themselves do not work when the elevation/depression angle is zero.

SUMMARY OF THE PRESENT INVENTION

The control unit 10 acquires a first coordinate position (image coordinate system) inside an image of each position indicator P (light source) included in an image captured with the camera C (imaging device) among the multiple position indicators P (light sources) whose coordinate positions are known in the three-dimensional space (world coordinate system).

The control unit 10 performs positioning processing to derive at least either of the coordinate position and the orientation of the own device (moving body 100) in the three-dimensional space (world coordinate system) based on the coordinate position of the position indicator P included in the image in the three-dimensional space and the first coordinate position inside the image.

Here, the control unit 10 detects, from the image captured with the camera C, identification information (light source ID) of the position indicator P included in the image and the first coordinate position inside the image to acquire a known coordinate position corresponding to the detected identification information in the three-dimensional space (world coordinate system).

The control unit 10 estimates a height of the camera in the three-dimensional space. Specifically, the control unit 10 sets the height of the camera C as a default value for the first time, and estimates a height of the camera C from the previous value from next time. The control unit 10 uses information on the estimated height of the camera C to perform positioning processing of the camera C (moving body 100).

The control unit 10 acquires a second coordinate position of the position indicator P on the image corresponding to the positioning processing result.

The control unit 10 corrects the height of the camera C based on the first coordinate position and the second coordinate position.

Based on the positioning processing result, the control unit 10 acquires, as the second coordinate position, a re-projected point obtained by reprojecting the position indicator P included in the image onto the image (perspective projection plane).

The control unit 10 corrects the height of the camera C based on the re-projected point and the first coordinate position of the position indicator P included in the image.

The control unit 10 finds a first elevation/depression angle as an elevation/depression angle from the camera C to the position indicator P from the first coordinate position inside the image of the position indicator P included in the image.

The control unit 10 finds a second elevation/depression angle as an elevation/depression angle from the camera C to the re-projected point.

The control unit 10 finds a distance between the position indicator P and the camera C in the horizontal direction based on the coordinate position of the position indicator P included in the image in the three-dimensional space, and the positioning result of the camera C.

The control unit 10 calculates a correction value for the height of the camera C based on the found distance, the first elevation/depression angle, and the second elevation/depression angle.

The control unit 10 uses a unit vector (uv') of a three-dimensional direction vector using the focal point of the camera C as a start point and the coordinate position of the position indicator P (light source) included in the image in the three-dimensional space as an end point to perform positioning processing.

[Operation of Moving Body]

Next, the operation of the moving body 100 will be described.

FIG. 7 is a flowchart illustrating overall processing executed in the moving body 100.

First, the control unit 10 performs direction vector calculation processing in the world coordinate system (step S1). The direction vector calculation processing in the world coordinate system is processing to calculate a direction vector in the world coordinate system in an image captured with the camera C at each light-emitting point received by visible light communication in a case where the orientation is set to 0.

Figure 8:
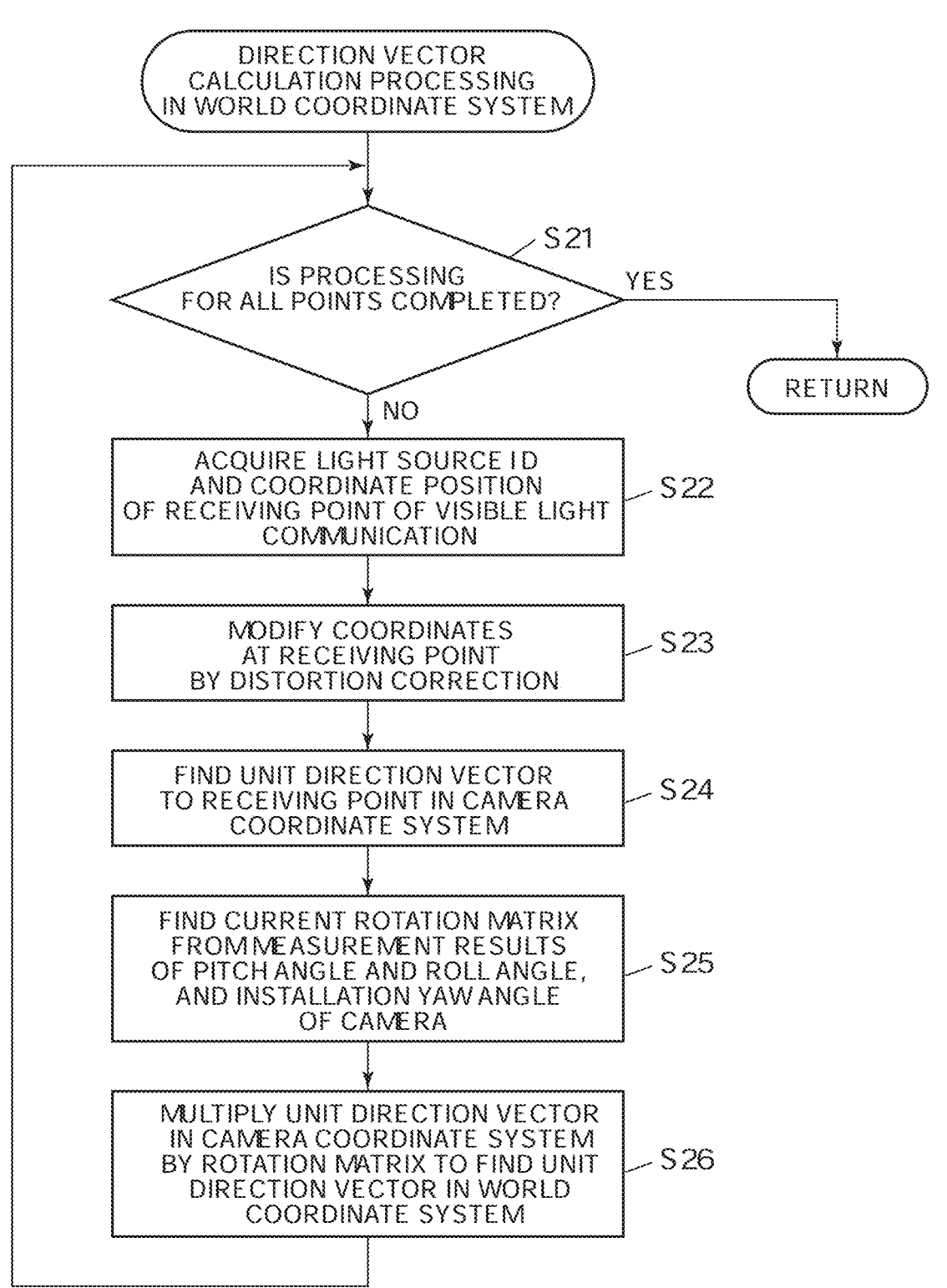
FIG. 8 is a flowchart illustrating direction vector calculation processing in a world coordinate system.

Referring here to FIG. 8, the vector calculation processing in the world coordinate system will be described.

The control unit 10 determines whether or not the processing for all points included in the captured image captured with each camera C is completed (step S21).

When the processing for any point included in the captured image is not completed (step S21: NO), the control unit 10 detects, from the captured image, a receiving point (light-emitting point) corresponding to an unprocessed position indicator P to acquire the light source ID and the coordinate position (image coordinate system) indicated by visible light communication (step S22).

Next, the control unit 10 corrects the lens distortion of the camera C to modify the coordinates at the receiving point (step S23).

Next, the control unit 10 finds a unit direction vector uv (see FIG. 6A) to the receiving point in the camera coordinate system (step S24).

Next, the control unit 10 acquires, from an attitude angle sensor 40 corresponding to the camera C that captures the receiving point as the processing target, measurement results of a pitch angle and a roll angle of the camera C. Then, the control unit 10 finds a current rotation matrix from the acquired pitch angle and roll angle, and an installation yaw angle of the camera C (step S25).

Next, the control unit 10 multiplies the unit direction vector uv in the camera coordinate system by the rotation matrix to find a unit direction vector uv' in the world coordinate system (see FIG. 6B) (step S26).

After step S26, the procedure returns to step S21.

In step S21, when the processing for all the points included in the captured image is completed (step S21: YES), the direction vector calculation processing in the world coordinate system is completed.

Returning to FIG. 7, the control unit 10 performs camera height estimation processing next (step S2).

Since height fluctuations are not very high frequency in positioning, an extremely simple prediction method is adopted in the present embodiment. As a technique for predicting the next value in time-series data from the history of past values, since there are various known methods, the prediction has just to be upgraded as appropriate by combining the prediction method with these known methods, or the like.

Note that, in third positioning calculation processing (a positioning method using three points included in the captured image) to be described later, any height value is not actually required, but the height of the camera C is estimated in the camera height estimation processing to respond to first positioning calculation processing or second positioning calculation processing (a positioning method using two points included in the captured image) to be described later.

It is assumed that, in the initial calculations, the first positioning calculation processing or the second positioning calculation processing is not performed until a corrected height is determined because the accuracy of the height cannot be expected. Further, even when the height is different in the initial state, the height can be initially calculated to obtain constant positioning results with large errors in the third positioning calculation processing, and a height corrected to some degree can be obtained by post-correction.

Figure 9:
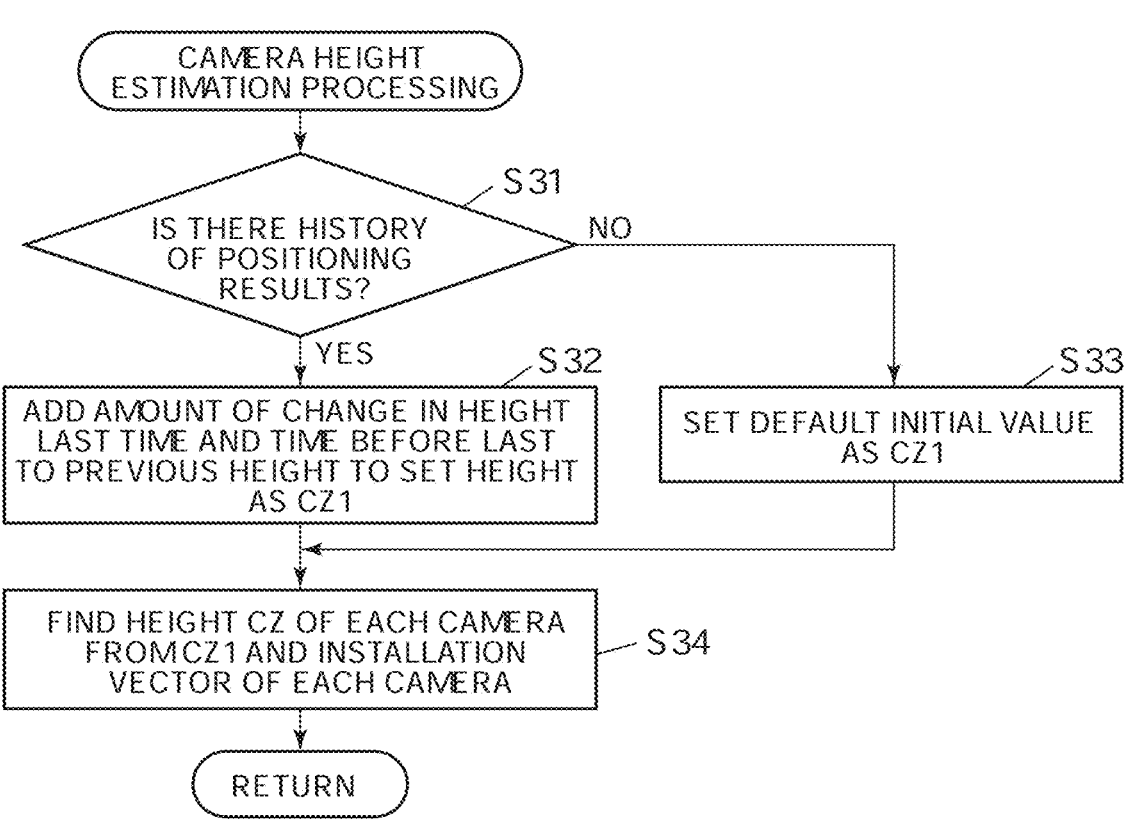
FIG. 9 is a flowchart illustrating camera height estimation processing.

Here, camera height estimation processing will be described with reference to FIG. 9.

The control unit 10 determines whether or not there is a history of positioning results in the storage unit 20 (step S31).

When there is a history of positioning results (step S31: YES), the control unit 10 adds the amount of change in height last time and the time before last to the previous height to set the height of the camera C1 as CZ1 (step S32).

In step S31, when there is no history of positioning results (step S31: NO), the control unit 10 sets the default initial value as the height CZ1 of the camera C1 (step S33).

Figure 10:
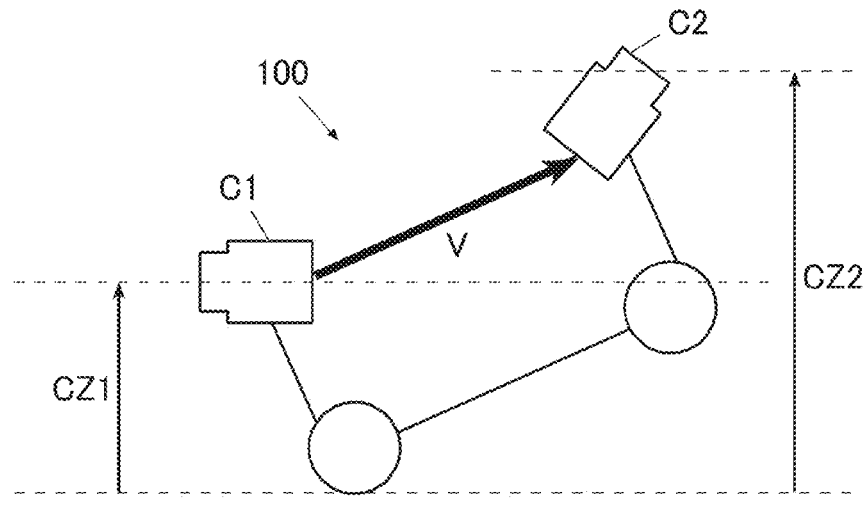
FIG. 10 is a diagram for describing how to find the height of each camera.

After step S32 or step S33, as illustrated in FIG. 10, the control unit 10 finds CZ as the height of each camera C from the height CZ1 of the camera C1 and the installation vector V of each camera C (step S34). Specifically, the control unit 10 adds CZ1 to a relative height between C1 and C obtained by multiplying a rotation matrix indicative of the attitude angles (pitch angle and roll angle) of the camera C1 by an installation vector V to the camera C to set the height of each camera C as CZ.

The camera height estimation processing is thus completed as mentioned above.

Next, returning to FIG. 7, the control unit 10 determines, from the captured image captured with the camera C, whether or not two or more of light-emitting points corresponding to position indicators P can be captured (step S3).

When two or more light-emitting points cannot be caught from the captured image (step S3: NO), that is, in the case of only one point reception or no receiving point, the procedure moves to step S4.

The control unit 10 uses a known position estimation method or the like to estimate the coordinate position and the orientation of the moving body 100 (camera C) from the history of previous positioning and a coordinate fluctuation at one receiving point (if there is one light-emitting point corresponding to the position indicator P in the captured image) (step S4).

In step S3, when two or more light-emitting points can be caught from the captured image (step S3: YES), the control unit 10 creates receiving points (a combination of two points or three points) used for positioning and a list of calculation methods to be applied (step S5).

For example, when two points at which the elevation/depression angles are the first threshold value or more are included in the captured image, the control unit 10 uses the combination of two points that satisfy this condition to add, to the list, the fact that the first positioning calculation processing is performed. As the first threshold value, for example, seven degrees is used.

When a point at which the elevation/depression angle is the first threshold value or more and a point at which the lateral prospective angle with this point is the second threshold value or more are included in the captured image, the control unit 10 uses the combination of two points that satisfy this condition to add, to the list, the fact that the second positioning calculation processing is performed. For example, seven degrees is used as the first threshold value and three degrees is used as the second threshold value.

When three points at which the lateral prospective angles between two points are the second threshold value or more are included in the captured image, the control unit 10 uses the combination of three points that satisfy this condition to add, to the list, the fact that the third positioning calculation processing is performed.

Figure 11A:
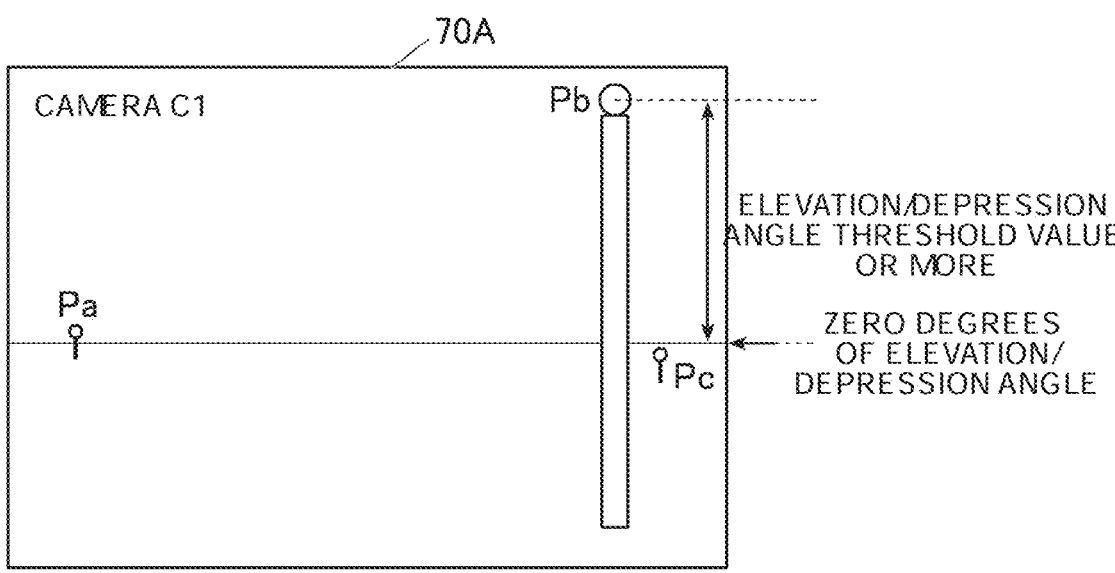
FIG. 11A illustrates an example of a captured image captured with a camera.
Figure 11B:
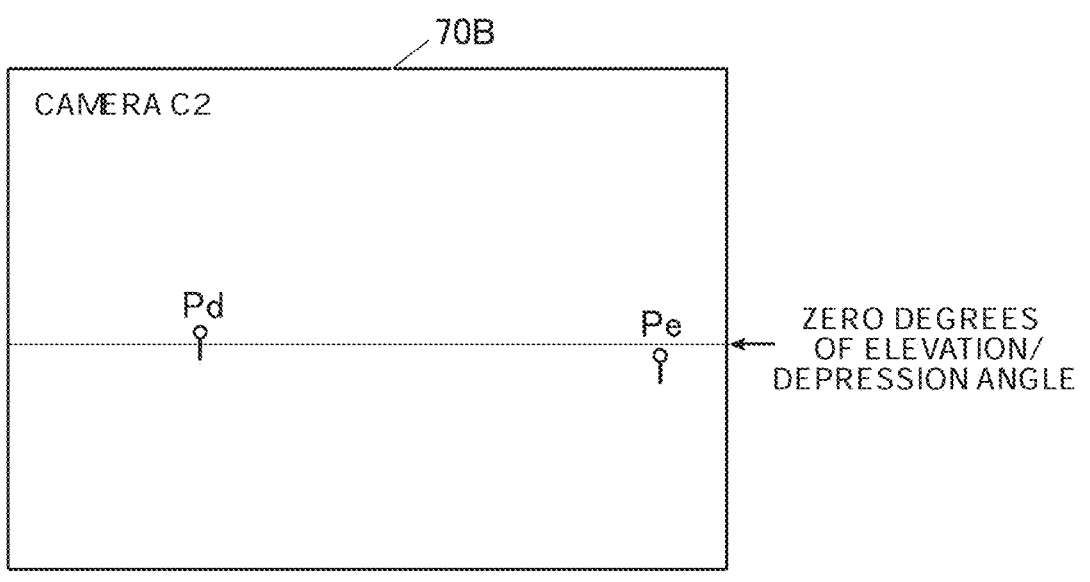
FIG. 11B illustrates an example of a captured image captured with another camera.

FIG. 11A illustrates an example of a captured image 70A captured with the camera C1, and FIG. 11B illustrates an example of a captured image 70B captured with the camera C2. It is assumed that the camera C1 and the camera C2 have a relative yaw angle of 180 degrees.

In the captured image 70A, position indicators Pa, Pb, and Pc are captured. The position indicator Pb has an elevation/depression angle of the first threshold value or more, and the position indicators Pa and Pc have elevation/depression angles less than the first threshold value.

In the captured image 70B, position indicators Pd and Pe are captured. The position indicators Pd and Pe have elevation/depression angles less than the first threshold value.

Further, it is assumed that the lateral prospective angle between the position indicator Pb and the position indicator Pc is less than the second threshold value, but the lateral prospective angles between the other combinations is the second threshold value or more.

When the captured image 70A illustrated in FIG. 11A and the captured image 70B illustrated in FIG. 11B are obtained, since there is no combination of two points between which the elevation/depression angle is the first threshold value or more, there is no combination of receiving points targeted for the first positioning calculation processing.

As for the second positioning calculation processing, the position indicator Pb having the elevation/depression angle of the first threshold value or more, and the combination of two points of the position indicators at which the lateral prospective angles from the position indicator Pb are the second threshold value or more is used. Specifically, combinations of (Pa, Pb), (Pb, Pd), and (Pb, Pe) are targeted for the second positioning calculation processing.

As for the third positioning calculation processing, combinations of three points at which the lateral prospective angles are the second threshold value or more are used. Specifically, combinations of (Pa, Pb, Pd), (Pa, Pb, Pe), (Pa, Pc, Pd), (Pa, Pc, Pe), (Pa, Pd, Pe), (Pb, Pd, Pe), and (Pc, Pd, Pe) are targeted for the third positioning calculation processing.

Note that if there are receiving points such as ten points in the captured image, the combinations for positioning processing will become huge, and the effect of improved accuracy will become saturated. Therefore, when the calculation amount is to be kept constant, the upper limit for the number of "combinations of two points or three points" used in the positioning processing may be predetermined and a predetermined priority may be set to remove a combination(s) that seems to have a low contribution to positioning. As the priority, for example, there are priorities to prioritize "a combination of two points larger in elevation/depression angle," "a combination of three points larger in lateral prospective angle," "two points, the positions of which are symmetrical to each other in the image (two points evenly viewed on the left and right sides across the horizontal center, rather than in the center and on a side even with the same prospective angle of 45 degrees)," and the like.

In the case of performing positioning processing on each combination of two points or three points to calculate a weighted average of each positioning result later, rather than performing positioning processing using all receiving points (light-emitting points) included in the captured image, highly accurate positioning results can be generally expected.

This is because, even when distortion correction is performed, the correction accuracy of the coordinates toward the edges of the image is poor due to the nonlinearity of the lens of the camera C in reality, and hence the influence of errors can be reduced by integrating the positioning results calculated individually for respective combinations of two points or three points, rather than solving simultaneous equations for all points. When an image coordinate-based re-projection error is large upon integrating the positioning results, there is a method for lowering the weight or the like.

After step S5, the control unit 10 executes positioning based on the created list using "receiving points used for positioning" by "calculation methods to be applied" (step S6 to step S8). Specifically, the control unit 10 performs the first positioning calculation processing (step S6), the second positioning calculation processing (step S7), and/or the third positioning calculation processing (step S8).

Note that, when the positions and attitude angles targeted for positioning between the reference camera C1 and the moving body 100 match each other, the positioning result of the reference camera C1 is set as the positioning result of the moving body 100. When the positions and attitude angles targeted for positioning between the reference camera C1 and the moving body 100 do not match each other, the positioning result of the moving body 100 can be derived from the positioning result of the reference camera C1 based on the difference between the reference camera C1 and the moving body 100.

First, the first positioning calculation processing (step S6) will be described.

<First Positioning Calculation Processing when Two Points are Captured with Same Camera>

When two points are captured with the same camera, a solution can be obtained by the linear system of simultaneous equations in equation (2) and equation (3) mentioned above.

<First Positioning Calculation Processing when One Point is Captured Respectively with Each of Two Cameras>

As illustrated in FIG. 12A, it is assumed that the three-dimensional installation vector from the camera C1 to the camera C2 is V, and a difference rotation matrix of attitude angles between the camera C1 and the camera C2 is R2.

In FIG. 12B, a unit direction vector uv1 to the position indicator P1 in the camera coordinate system of the camera C1 is illustrated.

In FIG. 12C, a unit direction vector uv2 to the position indicator P2 in the camera coordinate system of the camera C2 is illustrated.

In FIG. 12D, a coordinate position CamPos1 of the camera C1, a coordinate position CamPos2 of the camera C2, a coordinate position IDPos1 of the position indicator P1, and a coordinate position IDPos2 of the position indicator P2 in the world coordinate system are illustrated. Further, it is assumed that a distance between the camera C1 and the position indicator P1 is d1, and a distance between the camera C2 and the position indicator P2 is d2.

When a vector obtained by multiplying the unit direction vector uv1 by the rotation matrix (Rzθ) and further by the distance d1 is translated to the coordinate position Campos1, since the vector matches the vector from the Campos1 to the IDPos1, equation (4) is obtained.

$$Rz\theta \cdot uv1 * d1 + CamPos1 = IDPos1 - CamPos1 \qquad \text{Equation (4)}$$

As for the position indicator P2 captured with the camera C2, a difference rotation matrix R2 is also multiplied, and equation (5) is obtained.

$$Rz\theta \cdot R2 \cdot uv2 * d2 + CamPos2 = IDPos2 - CamPos2 \qquad \text{Equation (5)}$$

Further, equation (6) is obtained from the relationship between CamPos1 and CamPos2.

$$CamPos2 = CamPos1 + (Rz\theta \cdot V) \qquad \text{Equation (6)}$$

Note that uv1' and uv2' in FIG. 12D are expressed in the following equations (7) and (8).

$$uv1' = Rz\theta \cdot uv1 \qquad \text{Equation (7)}$$

$$uv2' = Rz\theta \cdot R2uv2 \qquad \text{Equation (8)}$$

The term CamPos2 can be removed from equation (4) to equation (6), and six unknown parameters (CX1, CY1, cos θZ1, sin θZ1, d1, d2) can be solved from the six equations.

Even when three or more cameras are installed, the coordinate position and the orientation of each camera can be obtained by the methods mentioned above if the installation vector from the camera C1 as a reference is taken into consideration.

Here, processing used commonly in the second positioning calculation processing and the third positioning calculation processing will be described.

Figure 13:
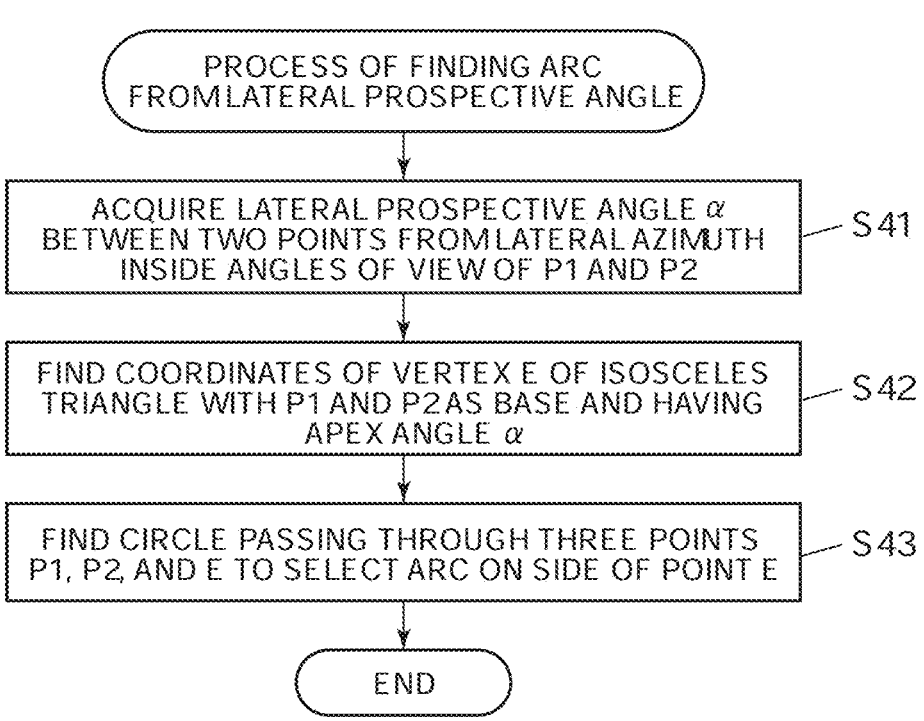
FIG. 13 is a flowchart illustrating processing of finding an arc from a lateral prospective angle.

Referring to FIG. 13, a process of finding an arc from a lateral prospective angle will be described. This process is a process of finding an arc as a set of positions that the camera C can exist using the inscribed angle theorem. In the following, position indicators P1, P2, and the like in the captured image or on a projection surface may also be called points P1, P2, and the like.

Figure 14:
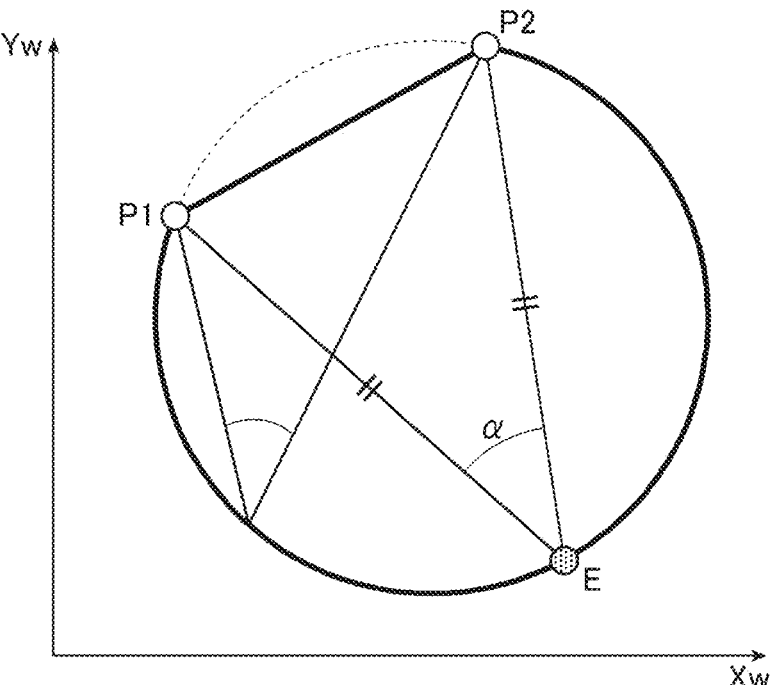
FIG. 14 is a diagram in which position indicators corresponding to receiving points in an image are projected onto an XY plane in the world coordinate system.

FIG. 14 is a diagram in which position indicators P1 and P2 corresponding to receiving points in an image are projected on the XY plane in the world coordinate system.

The control unit 10 acquires a lateral prospective angle α between the two points P1 and P2 from a lateral azimuth inside the angles of view of the points P1 and P2 in the captured image (step S41).

Next, the control unit 10 finds the coordinates of a vertex E of an isosceles triangle with a line segment connecting the point P1 and the point P2 on the XY plane as the base and having an apex angle α (step S42). Here, the control unit 10 finds the coordinates of the vertex E to make the points P1 and P2 satisfy the left-right relationship on the image.

Next, the control unit 10 finds a circle passing through three points of the point P1, the point P2, and the point E on the XY plane, and selects an arc on the side of the point E (step S43). This arc is an arc that satisfies the fact that the point P1 is visible on the left side of the point P2 and the lateral prospective angle between the two points P1 and P2 is α.

The process of finding an arc from the lateral prospective angle is thus completed.

Referring to FIG. 15, a process of finding an azimuth from the X and Y coordinates of the camera will be described.

The control unit 10 acquires coordinates CX and CY of the camera C (step S51).

Next, the control unit 10 selects a position indicator P as a receiving point closest to the center in the lateral direction within the angle of view of the camera (step S52).

Figure 16A:
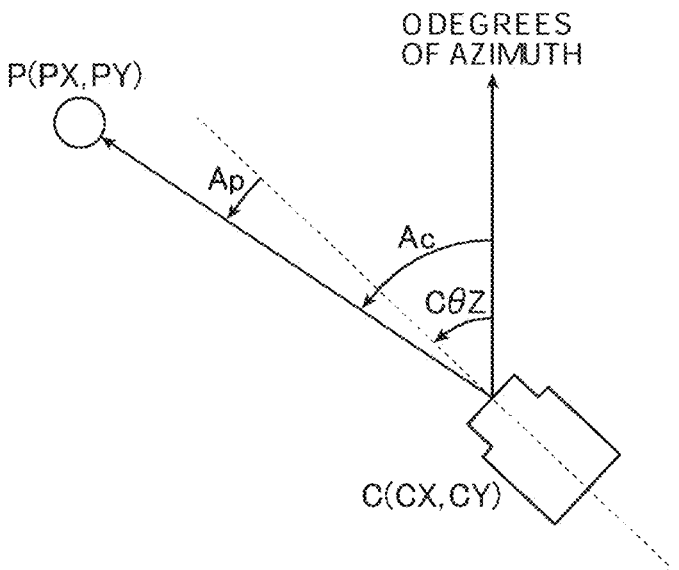
FIG. 16A is a diagram illustrating a positional relationship between the camera and a position indicator.

In FIG. 16A, a positional relationship between the camera C and the position indicator P is illustrated.

Figure 16B:
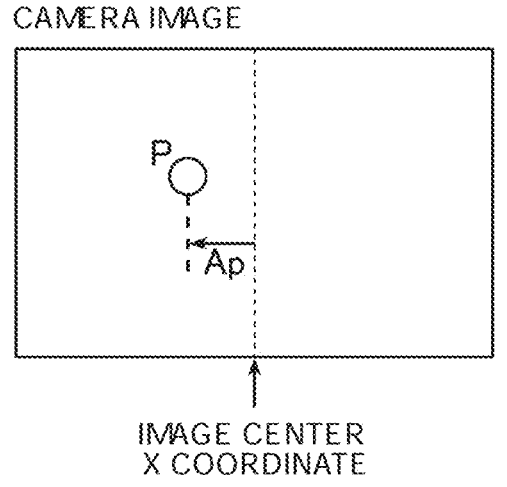
FIG. 16B is a diagram illustrating the position indicator inside an image captured with the camera.

In FIG. 16B, the position indicator P inside an image captured with the camera C is illustrated. The position indicator P closest to the center of the image in the horizontal direction (lateral direction) inside the captured image is selected.

Next, the control unit 10 finds an azimuth Ac of a vector from the camera C to the point P (step S53). Specifically, the control unit 10 finds the azimuth Ac based on the coordinates (CX and CY) of the camera C acquired in step S51, and known X and Y coordinates (PX and PY) of the position indicator P in the world coordinate system.

Next, the control unit 10 acquires a lateral azimuth Ap within the angle of view from the center of the captured image to the point P (step S54). Note that Ap takes a minus value on the left side from the center and takes a plus value on the right side in the lateral direction within the angle of view.

Next, the control unit 10 adds the lateral azimuth Ap (Ap is a minus value when the lateral azimuth Ap is on the left side of the X coordinate from the center at which there is the camera C) within the angle of view to the azimuth Ac to find an azimuth C$\theta$Z of the camera C (step S55).

Next, the control unit 10 acquires an installation yaw angle S$\theta$Z of the camera C (step S56).

Next, the control unit 10 adds the installation yaw angle S$\theta$Z to the azimuth C$\theta$Z of the camera C to set the addition result as an azimuth $\theta$Z of the moving body 100 (step S57).

The process of finding the azimuth from the X and Y coordinates of the camera is thus completed.

Note that since correction errors in camera distortion tend to occur near the edges of the image, the point P closest to the center is selected in step S52, but all azimuths may be calculated for respective points of the same camera using the azimuth calculation method mentioned above to take an average or weighted average. As the weighted average, for example, the weight is reduced as the point is further away from the image center coordinates.

Next, second positioning calculation processing (step S7) will be described.

<Second Positioning Calculation Processing when Two Points are Captured with Same Camera>

Referring to FIG. 17, second positioning calculation processing (two points/one camera) will be described.

Figure 18A:
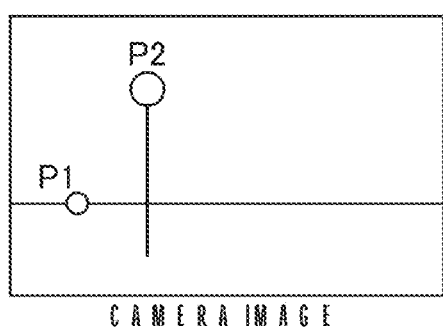
FIG. 18A illustrates an example of a captured image captured with a certain camera.

In FIG. 18A, an example of a captured image captured with a certain camera C is illustrated.

The control unit 10 sets, as P1, a point at which the elevation/depression angle is less than the first threshold value, and sets, as P2, a point at which the elevation/depression angle is the first threshold value or more (step S61).

Next, the control unit 10 acquires three-dimensional coordinates of the installation positions of the points P1 and P2 (step S62). Specifically, the control unit 10 acquires, from the light source ID-3D coordinate table 21, the three-dimensional coordinates corresponding to the light source IDs of the respective points P1 and P2.

Figure 18B:
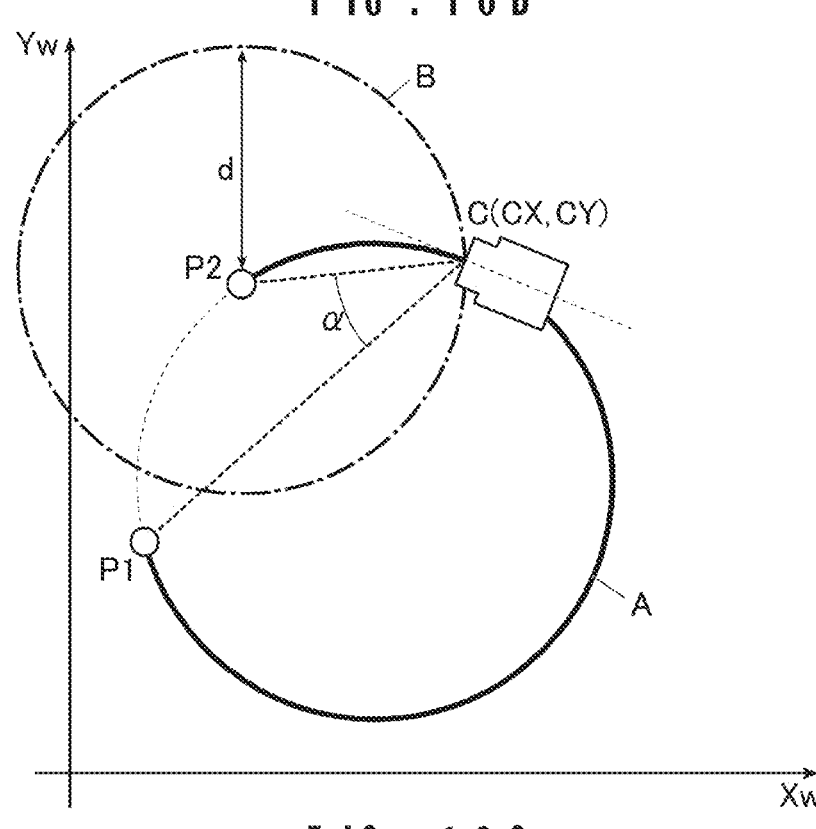
FIG. 18B is a diagram illustrating respective position indicators and the camera projected on the XY plane in the world coordinate system.

FIG. 18B is a diagram illustrating the position indicators P1, P2, and the camera C projected on the XY plane in the world coordinate system.

Next, the control unit 10 finds a lateral prospective angle $\alpha$ between the point P1 and the point P2 inside the captured image. Then, the control unit 10 finds an arc A that the camera C projected on the XY plane can exist from the X and Y coordinates of the point P1, the X and Y coordinates of the point P2, and the lateral prospective angle $\alpha$ (step S63). The details of the process are the same as in FIG. 13.

Next, the control unit 10 finds a distance d between the camera C and the point P2 on the XY plane from a direction vector from the camera C to the point P2 by trigonometry (step S64).

Figure 18C:
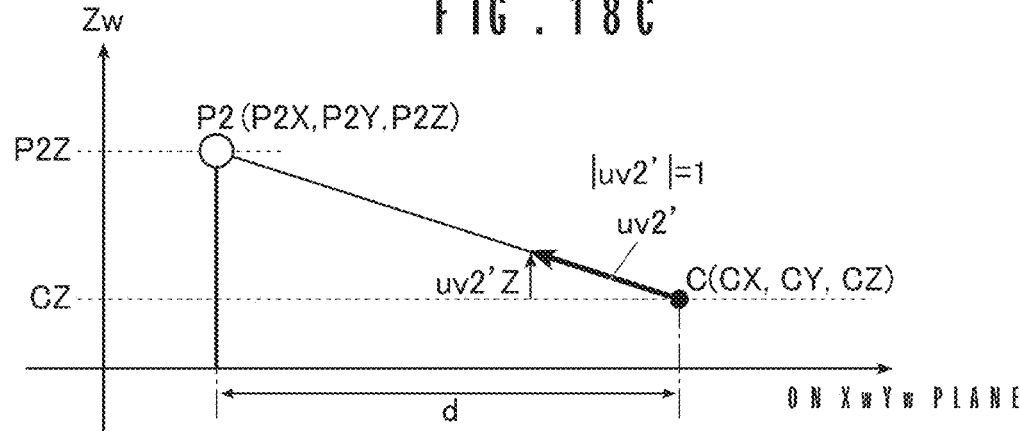
FIG. 18C is a diagram illustrating the camera and a position indicator in the world coordinate system.

FIG. 18C is a diagram illustrating the camera C (CX, CY, CZ) and the point P2 (P2X, P2Y, P2Z) in the world coordinate system. The vertical axis is the Z-axis direction, and the horizontal axis is a direction from the point P2 toward the camera C. The distance d is obtained by equation (9) below.

Note that Z component of a unit direction vector uv2' from the camera C toward the point P2 is set as uv2'Z.

$$d = (P2Z - CZ) \cdot \frac{\sqrt{1 - (uv2'Z)^2}}{uv2'Z} \qquad \text{Equation (9)}$$

Next, the control unit 10 finds a circle B centered on the point P2 with a radius d on the XY plane (step S65).

Next, the control unit 10 finds intersection points of the arc A and the circle B, and sets an intersection point that satisfies the left-right relationship of the points P1 and P2 as the X and Y coordinates of the camera C (step S66).

Next, the control unit 10 finds an azimuth $\theta$Z of the camera C from the X and Y coordinates of the camera C (step S67). The details of the process are the same as in FIG. 15.

Here, when the camera C is not the reference camera C1, the control unit 10 finds the X and Y coordinates and the azimuth $\theta$Z of the reference camera C1 based on an installation vector from the reference camera C1 to the camera C (step S68).

The second positioning calculation processing (two points/one camera) is thus completed.

<Second Positioning Calculation Processing when Capturing One Point Respectively with Two Cameras>

Figure 19:
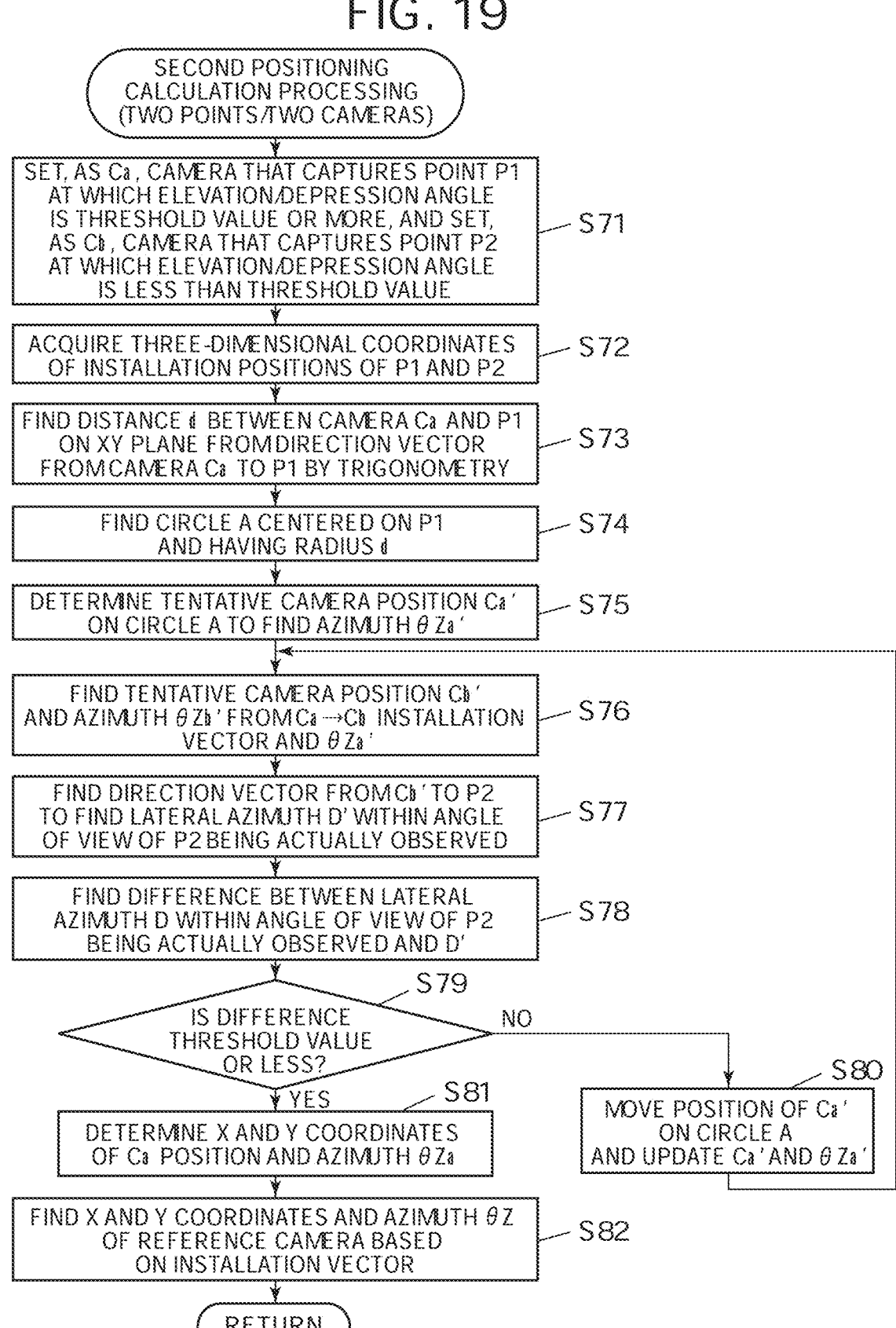
FIG. 19 is a flowchart illustrating second positioning calculation processing when two cameras capture one points, respectively.

Referring to FIG. 19, second positioning calculation processing (two points/two cameras) will be described.

In FIG. 20A and FIG. 20B, an example of captured images captured with cameras Ca and Cb is illustrated.

The control unit 10 sets, as Ca, a camera that captures a point P1 at which the elevation/depression angle is the first threshold value or more, and sets, as Cb, a camera that captures a point P2 at which the elevation/depression angle is less than the first threshold value (step S71).

Next, the control unit 10 acquires three-dimensional coordinates of the installation positions of the points P1 and P2 (step S72). Specifically, the control unit 10 acquires, from the light source ID-3D coordinate table 21, 3D coordinates corresponding to the light source IDs of the respective points P1 and P2.

FIG. 20C is a diagram in which the position indicators P1, P2, and the camera Ca, Cb are projected onto the XY plane in the world coordinate system.

Next, the control unit 10 finds a distance d between the camera Ca and the point P1 on the XY plane from a direction vector from the camera Ca to the point P1 by trigonometry (step S73).

Next, the control unit 10 finds a circuit A centered on the point P1 on the XY plane and having a radius d (step S74).

Next, the control unit 10 determines a tentative camera position Ca' on the circle A to find a tentative azimuth θZa' of the camera Ca (step S75). The details of the process are the same as in FIG. 15.

Here, when there is no history of previous states, the control unit 10 sets the orientation 0 as the tentative camera position Ca'. On the other hand, when there is a history of previous states, the control unit 10 sets, as the tentative camera position Ca', a point closest to the previous position on the circumference.

Next, the control unit 10 finds an installation vector (relative positional relationship) from the camera Ca to the camera Cb from the relationship of the initial installation vectors. Then, the control unit 10 finds a tentative camera position Cb' and a tentative azimuth θZb' of the camera Cb based on the installation vector from the camera Ca to the camera Cb, and the azimuth θZa' (step S76). The details of the process is the same as in FIG. 15.

Next, the control unit 10 finds a direction vector from the tentative camera position Cb' to the point P2 to find a lateral azimuth D' within the angle of view (step S77). The details of the process of finding the lateral azimuth D' within the angle of view is the same as the process in step S53 of FIG. 15.

Next, the control unit 10 finds a difference between a lateral azimuth D within the angle of view of the point P2 being actually observed by the camera Cb and the lateral azimuth D' within the angle of view found in step S77 (step S78).

Here, the control unit 10 determines whether or not the difference between D and D' is a threshold value or less (step S79).

When the difference between D and D' is greater than the threshold value (step S79: NO), the control unit 10 moves the tentative camera position Ca' on the circle A according to the difference in azimuth, and updates Ca' and the azimuth θZa' (step S80). After step S80, the procedure returns to step S76, and the processes are repeated until the difference between D and D' is the threshold value or less in step S79.

In step S79, when the difference between D and D' is the threshold value or less (step S79: YES), the control unit 10 determines the X and Y coordinates of the camera Ca and the azimuth θZa of the camera Ca (step S81).

Here, when the camera Ca is not the reference camera C1, the control unit 10 finds the X and Y coordinates and the azimuth θZ of the reference camera C1 based on an installation vector from the reference camera C1 to the camera Ca (step S82).

The second positioning calculation processing (two points/two cameras) is thus completed.

Next, the third positioning calculation processing (step S8) will be described.

<Third Positioning Calculation Processing when Three Points are Captured with Same Camera>

Referring to FIG. 21, third positioning calculation processing (three points/one camera) will be described.

In FIG. 22A, an example of a captured image captured with a certain camera C is illustrated.

The control unit 10 sets three points captured with the camera C as P1, P2, and P3 in order from the left (step S91).

Next, the control unit 10 acquires the X and Y coordinates of the installation positions of the three points P1, P2, and P3 (step S92). Specifically, the control unit 10 acquires, from the light source ID-3D coordinate table 21, three-dimensional coordinates corresponding to the light source IDs of the respective points P1, P2, and P3.

FIG. 22B is a diagram in which the position indicator P1, P2, and P3 and the camera C are projected on the XY plane in the world coordinate system.

Next, the control unit 10 finds a lateral prospective angle α between the point P1 and the point P2 within the captured image. Then, the control unit 10 finds an arc A that the camera C projected on the XY plane can exist from the X and Y coordinates of the point P1, the X and Y coordinates of the point P2, and the lateral prospective angle α (step S93). The details of the process are the same as in FIG. 13.

Next, the control unit 10 finds a lateral prospective angle β between the point P2 and the point P3 within the captured image. Then, the control unit 10 finds an arc B that the camera C projected on the XY plane can exist from the X and Y coordinates of the point P2, the X and Y coordinates of the point P3, and the lateral prospective angle β (step S94). The details of the process are the same as in FIG. 13.

Next, the control unit 10 finds intersection points between the arc A and the arc B, and sets an intersection point that is not on the side of the point P2 as the X and Y coordinates of the camera C (step S95).

Next, the control unit 10 finds the azimuth θZ of the camera C from the X and Y coordinates of the camera C (step S96). The details of the process are the same as in FIG. 15.

Here, when the camera C is not the reference camera C1, the control unit 10 finds the X and Y coordinates and the azimuth θZ of the reference camera C1 based on an installation vector from the reference camera C1 to the camera C (step S97).

The third positioning calculation processing (three points/one camera) is thus completed.

<Third Positioning Calculation Processing when Two Points and One Point are Captured Respectively with Two Cameras>

Figure 23:
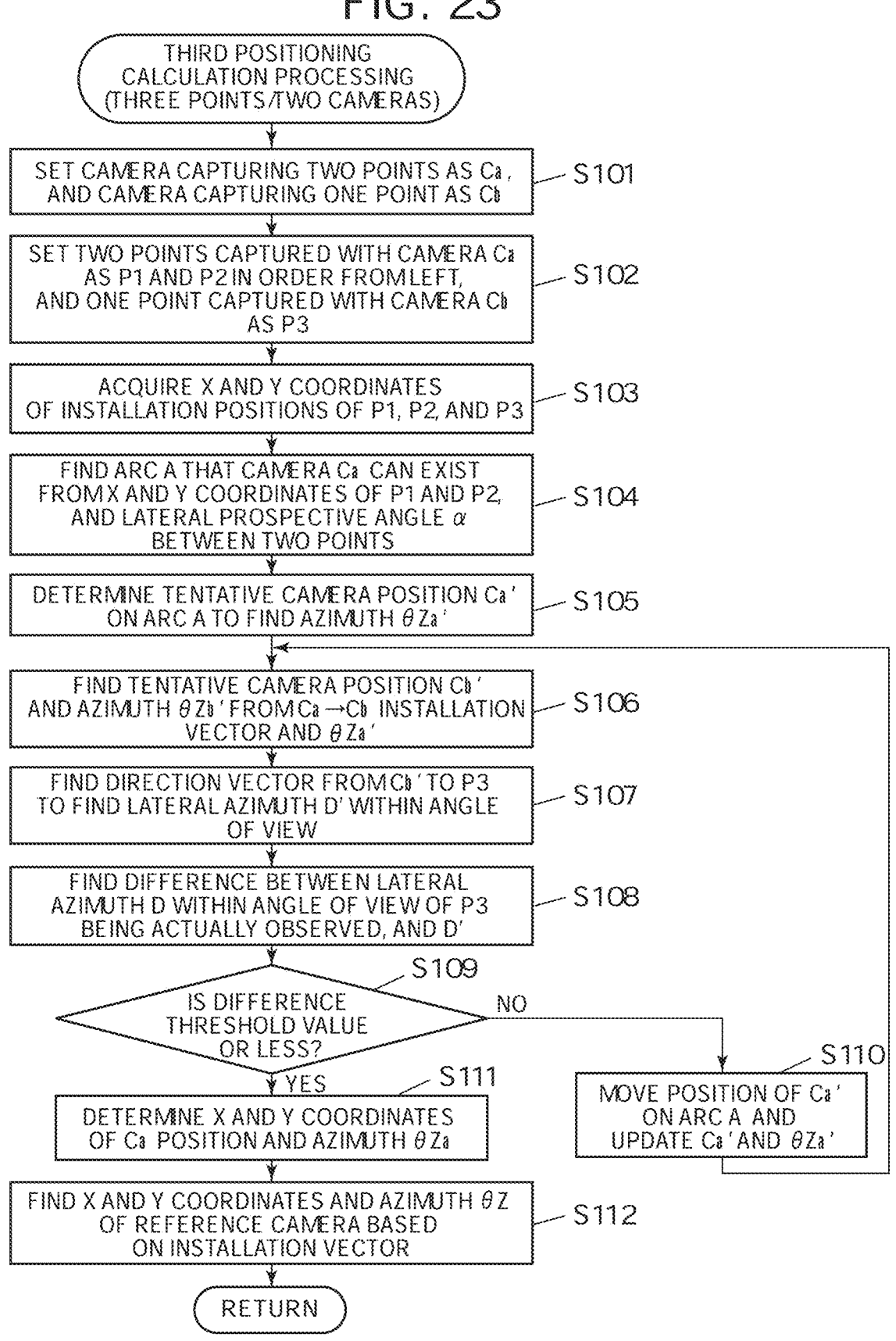
FIG. 23 is a flowchart illustrating third positioning calculation processing when two points and one point are captured with two camera, respectively.

Referring to FIG. 23, third positioning calculation processing (three points/two cameras) will be described.

Figure 24A:
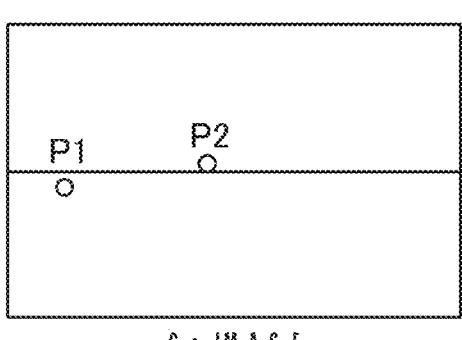
FIG. 24A illustrates an example of a captured image captured with a camera.
Figure 24B:
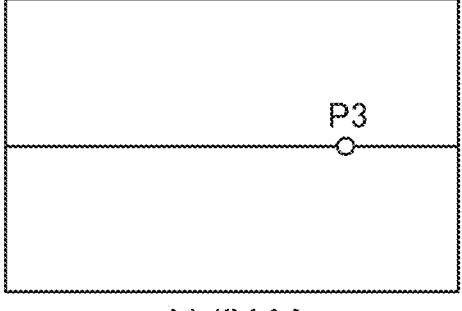
FIG. 24B illustrates a captured image captured with another camera.

In FIG. 24A and FIG. 24B, an example of captured images captured with the cameras Ca and Cb.

The control unit 10 sets the camera capturing two points as Ca, and the camera capturing one point as Cb (step S101).

Next, the control unit 10 sets the two points captured with the camera Ca as P1 and P2 in order from the left, and the one point captured with the camera Cb as P3 (step S102).

Next, the control unit 10 acquires X and Y coordinates of the installation positions of the tree points of P1, P2, and P3 (step S103). Specifically, the control unit 10 acquires, from the light source ID-3D coordinate table 21, three-dimensional coordinates corresponding to the light source IDs of the respective points P1, P2, and P3.

Figure 24C:
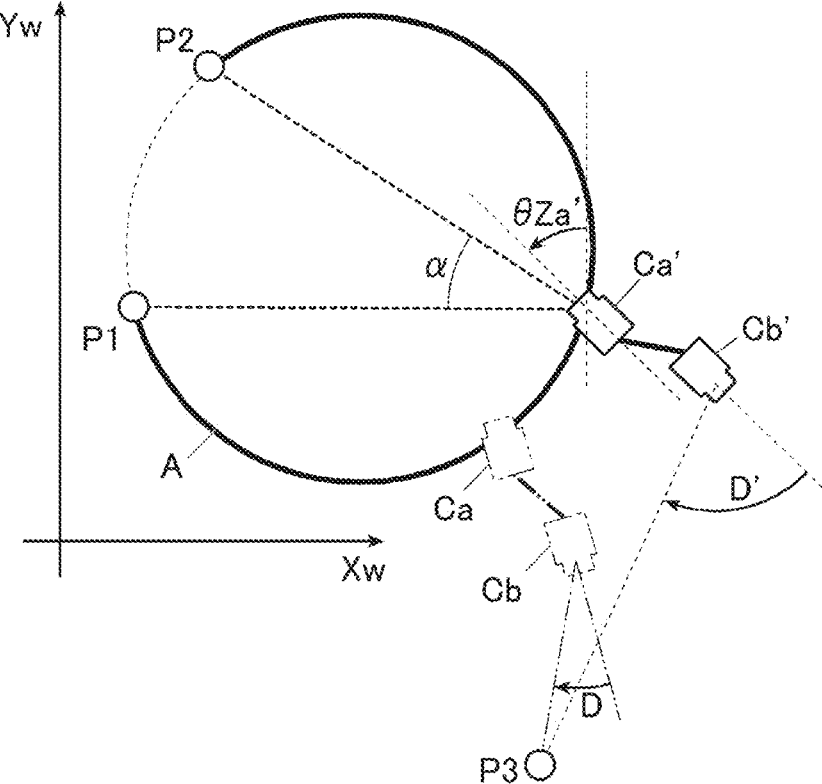
FIG. 24C is a diagram in which respective position indicators and the respective cameras are projected on the XY plane in the world coordinate system.

FIG. 24C is a diagram in which the position indicators P1, P2, and P3, and the cameras Ca and Cb are projected on the XY plane in the world coordinate system.

Next, the control unit 10 finds a lateral prospective angle α between the point P1 and the point P2 within the captured image. Then, the control unit 10 finds an arc A that the camera Ca can exist from the X and Y coordinates of the point P1, the X and Y coordinates of the point P2, and the lateral prospective angle α (step S104). The details of the process are the same as in FIG. 13.

Next, the control unit 10 determines a tentative camera position Ca' on the arc A to find an azimuth θZa' (step S105). The details of the process are the same as in FIG. 15. As the initial position of the tentative camera position Ca', a point corresponding to the vertex E of the isosceles triangle found in step S42 may be used. Further, when the positioning state is continuous, it is even better that a point closest to estimated coordinates on the arc A is set as the initial position from a past positioning history.

Next, the control unit 10 finds an installation vector (relative positional relationship) from the camera Ca to the camera Cb from the initial installation vector relationship. Then, the control unit 10 finds a tentative camera position Cb' and a tentative azimuth θZb' of the camera Cb based on the installation vector from the camera Ca to the camera Cb and the azimuth θZa' (step S106). The details of the process are the same as in FIG. 15.

Next, the control unit 10 finds a direction vector from the tentative camera position Cb' to the point P3 to find a lateral azimuth D' within the angle of view (step S107). The details of the process of finding the lateral azimuth D' within the angle of view are the same as the process in step S53 of FIG. 15.

Next, the control unit 10 finds a difference between a lateral azimuth D within the angle of view of the point 3 being actually observed by the camera Cb, and the lateral azimuth D' within the angle of view found in step S107 (step S108).

Here, the control unit 10 determines whether or not the difference between D and D' is a threshold value or less (step S109).

When the difference between D and D' is greater than the threshold value (step S109: NO), the control unit 10 moves the tentative camera position Ca' on the circle A according to the difference in azimuth, and updates Ca' and the azimuth θZa' (step S110). After step S110, the procedure returns to step S106, and the processes are repeated until the difference between D and D' is the threshold value or less in step S109.

In step S109, when the difference between D and D' is the threshold value or less (step S109: YES), the control unit 10 determines the X and Y coordinates of the camera Ca and the azimuth θZa of the camera Ca (step S111).

Here, when the camera Ca is not the reference camera C1, the control unit 10 finds the X and Y coordinates and the azimuth θZ of the reference camera C1 based on an installation vector from the reference camera C1 to the camera Ca (step S112).

The third positioning calculation processing (three points/two cameras) is thus completed.

Parallel computing is not required in the first to third positioning calculation processing, which means that a combination of receiving points used in each processing is extracted according to the list created in step S5, and suitable positioning calculation processing is performed using the combination.

Returning to FIG. 7, after step S6 to step S8, the control unit 10 determines whether or not there is a valid positioning result (step S9).

When there is no valid positioning result (step S9: NO), the procedure moves to step S4.

In step S9, when there is a valid positioning result (step S9: YES), the control unit 10 performs weighted average processing on the positioning result (step S10).

Referring to FIG. 25, weighted average processing on the positioning result will be described.

The control unit 10 finds a re-projection error between respective positioning results (step S121). Specifically, the control unit 10 finds the re-projection error using a difference (distance), as an indicator, between a point, at which a known installation position (three-dimensional coordinates) of each position indicator P is re-projected on the captured image (projection surface) of the camera C, and a point on the captured image actually captured with the camera C. Note that the control unit 10 finds re-projection errors in all points included in the captured image, rather than only the points used for positioning, for each combination of the "calculation methods to be applied" and the "receiving points used for positioning."

Next, the control unit 10 takes a weighted average of each positioning result using a reciprocal of the re-projection error as a weight (step S122).

FIG. 26 is an image diagram of weighted averages of positioning results. Each point illustrated in FIG. 26 indicates a positioning result of the camera C (moving body 100) in the world coordinate system and a weighted average value of each positioning result. For each positioning result, the calculation method (second positioning calculation processing/third positioning calculation processing), used points (a combination of position indicators P used in the positioning processing), and a re-projection error are illustrated. Note that the second positioning calculation processing is abbreviated as "second" and the third positioning calculation processing is abbreviated as "third" in FIG. 26.

Next, the control unit 10 finds an orientation of the reference camera C1 (step S123) using a lateral azimuth within the angle of view in average coordinates.

The weighted average processing on the positing result is thus completed.

Next, returning to FIG. 7, the control unit 10 performs height correction processing by re-projection (step S11). Assuming that the X and Y coordinates obtained as the positioning result are accurate, if the initially estimated height is different, the height will shift in the up and down direction (image Y-axis direction) according to the distance from the camera C to the position indicator P. In this processing, final height correction is made using information on a deviation in the captured image.

Figure 27:
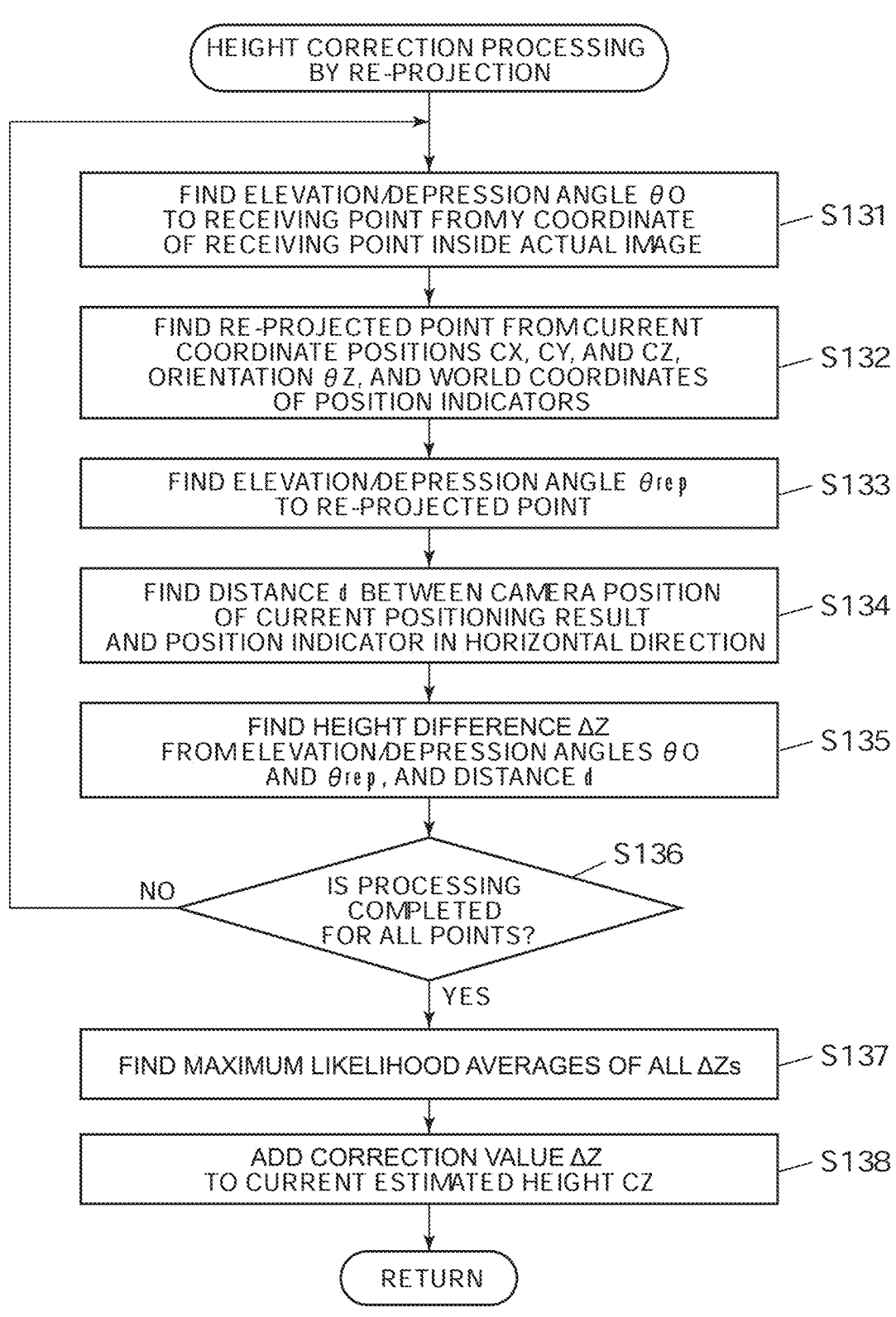
FIG. 27 is a flowchart illustrating height correction processing by re-projection.

Referring to FIG. 27, height correction processing by re-projection will be described.

Figure 28A:
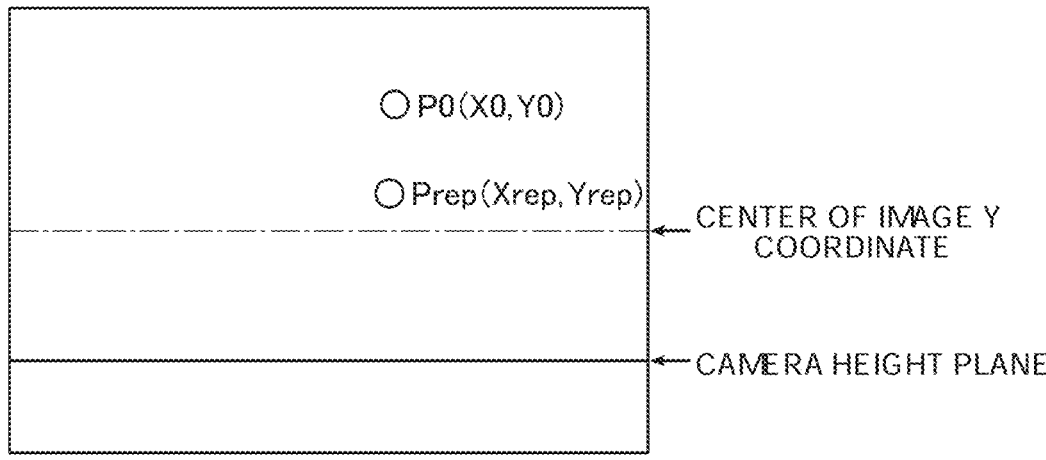
FIG. 28A is a diagram illustrating an actual receiving point in a captured image captured with a certain camera, and a re-projected point based on the current positioning result.

In FIG. 28A, an actual receiving point P0 in a captured image captured with a certain camera C, and a re-projected point Prep based on the current positioning result are illustrated. The vertical direction in FIG. 28A is the Y-axis direction of the image coordinate system, which corresponds to the Z-axis direction of the world coordinate system. A "camera height plane" illustrated in FIG. 28A is a plane obtained by shifting an ideal horizon by a camera height, and the capturing position varies depending on the pitch angle by the camera installation position and the slope of the ground. The horizontal direction in FIG. 28A is the X-axis direction of the image coordinate system.

Figure 28B:
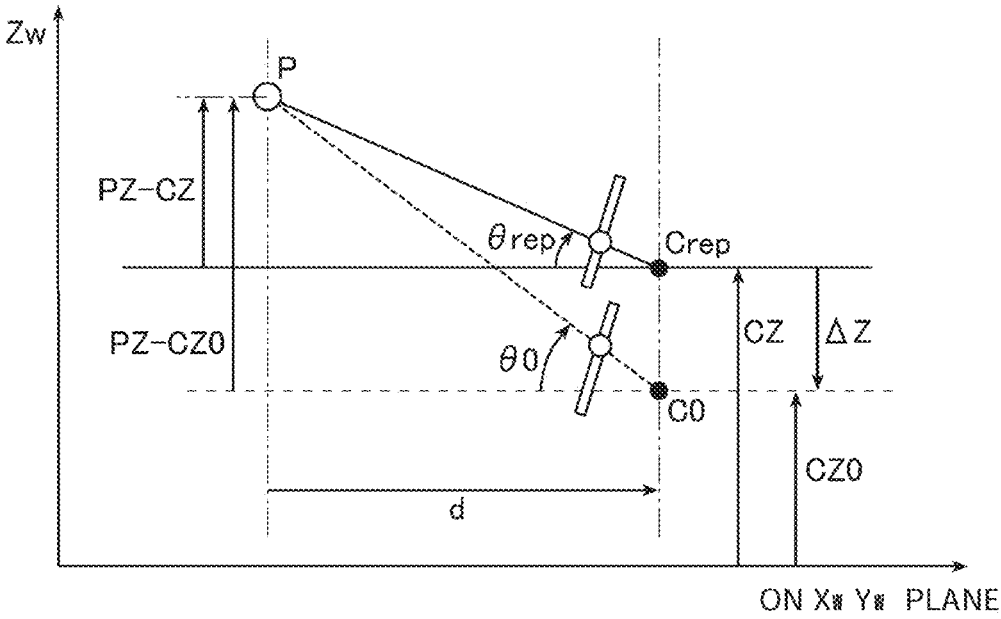
FIG. 28B is a diagram illustrating the positional relationship between a position indicator and the camera.

FIG. 28B is a diagram illustrating the positional relationship between the position indicator P and the camera C when the Z-axis direction of the world coordinate system is taken in the longitudinal direction and the direction from the position indicator P toward the camera C is taken in the lateral direction. In FIG. 28B, a camera position corresponding to the current positioning result is indicated as Crep, and the actual camera position is indicated as C0.

First, the control unit 10 finds an elevation/depression angle θ0 to the receiving point P0 from the Y coordinate of a receiving point P0 inside an actual image (an up-and-down position in the image coordinate system) (step S131).

The elevation/depression angle θ0 is obtained by equation (10) in which θX is an observed pitch angle of the camera C, Y0 is the Y coordinate of the receiving point inside the actual image, and a value obtained by dividing the focal length of the camera C by one pixel side length is f.

$$\theta 0 = \theta X + \mathrm{atan}(Y0/f) \qquad\qquad \text{Equation (10)}$$

Next, the control unit 10 finds the coordinates (Xrep, Yrep) of the re-projected point Prep obtained by re-projecting the position indicator P onto the captured image from the current coordinate position CX, CY, and CZ, the orientation θZ, and the world coordinates of the position indicator P (light source) (step S132).

Next, the control unit 10 finds an elevation/depression angle θrep to the re-projected point Prep (step S133).

The elevation/depression angle θrep is obtained by equation (11) in which the pitch angle of the observed camera C is θX, the Y coordinate of the re-projected point Prep is Yrep, and a value obtained by dividing the focal length of the camera C by one pixel side length is f.

$$\theta rep = \theta X + \operatorname{atan}(Yrep/f) \qquad \text{Equation (11)}$$

Next, the control unit 10 finds a distance d between the camera position Crep of the current positioning result and the position indicator P in the horizontal direction (on the XY plane of the world coordinate system) (step S134).

Next, the control unit 10 finds a height difference ΔZ of the camera C from the elevation/depression angle θ0 corresponding to the actually observed receiving point P0, the elevation/depression angle θrep corresponding to the re-projected point Prep, and the distance d found in step S134 (step S135). This height difference ΔZ is the correction value.

The height difference ΔZ is obtained by equation (12).

$$\Delta Z = d * \tan(\theta rep) - d * \tan(\theta 0) \qquad \text{Equation (12)}$$

Here, the control unit 10 determines whether or not the processing is completed for all receiving points (step S136).

When there is any receiving point for which the processing is not completed (step S136: NO), the procedure returns to step S131. The control unit 10 repeats the processing on any other receiving point as a processing target.

In step S136, when the processing is completed for all the receiving points (step S136: YES), the control unit 10 finds the maximum likelihood averages of all ΔZs (step S137). Here, for example, when averaging the correction value ΔZ indicated by each point, since the up-and-down position of a receiving point inside the image corresponding to a position indicator P close in distance from the camera C can change significantly, the control unit 10 increases the weight for averaging.

Next, the control unit 10 adds a correction value ΔZ to a current estimated height CZ of the camera (the value used for calculating the re-projected point) to find the final height this time (step S138).

Although there is actually a shift in the image X-axis direction due to errors in positioning itself and distortion correction errors, the control unit 10 finds a correction value ΔZ for each receiving point from a coordinate difference in the up and down direction and the position of the target position indicator P on the assumption that the height difference is dominant.

The height correction processing by re-projection is thus completed.

Returning to FIG. 7, after step S11 or step S4, the control unit 10 makes a final correction by filtering or the like to estimate the coordinate position and orientation of the moving body 100 (camera C) (step S12).

When there are the positioning history and the current calculation results, a known state estimation method using a Kalman filter or the like valid under the system conditions can be used.

After step S12, the procedure returns to step S1 to repeat the same processing.

Note that, in cases where the combination conditions of the first to third positioning calculation processing are not met though not illustrated in the flowchart of FIG. 7, such as "when two points at which the elevation/depression angles are less than the first threshold value," and "when three points are received but mutual lateral prospective angles are not the second threshold value or more," there is no combination used for the positioning processing. In this case, the control unit 10 should determine that there is no valid positioning result in step S9 and move to step S4.

Further, even when the calculations diverge or impossible after the first to third positioning calculation processing is performed, the control unit 10 should determine that there is no valid positioning result in step S9 and move to step S4.

As described above, according to the present embodiment, the control unit 10 uses such information that an angle of a light source (position indicator P) from the camera C (imaging device) to a predetermined direction or a prospective angle between light sources in the horizontal direction satisfies a predetermined condition to derive at least either of the coordinate position and the orientation of the own device (the moving body 100). This results in being able to respond to placement situations of various position indicators P and to provide a high-precision positioning result in self-positioning.

Further, based on the positioning processing result, the control unit 10 acquires, as the second coordinate position, a re-projected point of the position indicator P (light source) included in the image, and corrects the height of the camera C based on the re-projected point and the first coordinate position of the position indicator P. Thus, positioning in the height direction can be performed with high precision, and hence a high-precision positioning result can be provided in self-positioning. Specifically, a pre-estimated height can be corrected using a deviation in the up and down direction between the position of the position indicator P observed on the image captured with the camera and the re-projected point.

Further, the control unit 10 finds an elevation/depression angle θ0 (first elevation/depression angle) to the position indicator P included in the captured image, an elevation/depression angle θrep (second elevation/depression angle) to the re-projected point, and a distance d between the position indicator P and the camera C in the horizontal direction, and calculates a correction value ΔZ for the height of the camera C based on the distance d, the elevation/depression angle θ0, and the elevation/depression angle θrep. Thus, the height of the camera C can be calculated with geometric calculations.

Further, the control unit 10 uses the unit direction vector uv' from the focal point of the camera C toward the position indicator P to be able to easily obtain an azimuth of the camera C (moving body 100) based on a vector obtained by projecting the unit direction vector onto the XY plane.

Further, since the control unit 10 detects identification information on the position indicator P included in an image from the image captured with the camera C to acquire a known coordinate position in the three-dimensional space corresponding to the detected identification information, the position indicator P on the image can be identified accurately.

Further, the position indicator P can be caught efficiently by using multiple cameras C1 and C2, and hence positioning accuracy is improved. It is better to view a wide range using the multiple cameras C, rather than using a single camera having a large wide-angle lens, in order to make it easy to get distance performance and the like. Further, use of the multiple cameras C can avoid the influence of correction errors in lens distortion of the wide-angle lens.

Note that the description in the aforementioned embodiment is to describe an example of the information processing apparatus according to the present invention, but the present invention is not limited to this example. The detailed configuration of each of units that construct the device and the detailed operation can also be changed as appropriate without departing from the spirit of the present invention.

For example, the example in which the two front and rear cameras are used as the cameras C is described, but three or more cameras C may also be installed in the moving body 100.

A computer readable medium on which a program for executing each processing is not limited to that in the above example. As other computer readable media, a non-volatile memory such as a flash memory and a portable recording medium such as a CD-ROM can also be applied. Further, as a medium providing data of the program via a communication line, a carrier wave may also be applied.

What is claimed is:

1. An information processing apparatus comprising one or more processors configured to:

acquire a first coordinate position inside an image of at least one light source included in an image captured with an imaging device among a plurality of light sources whose coordinate positions in a three-dimensional space are known;

estimate a height of the imaging device in the three-dimensional space;

perform positioning processing to derive at least either of a coordinate position and an orientation of an own device in the three-dimensional space based on a coordinate position of the at least one light source included in the image in the three-dimensional space, the first coordinate position and the estimated height of the imaging device in the three-dimensional space;

acquire a second coordinate position of the light source on the image corresponding to a result of the positioning processing; and correct the height of the imaging device based on the first coordinate position and the second coordinate position.

2. The information processing apparatus according to claim 1, wherein the one or more processors are configured to:

acquire, as the second coordinate position, a re-projected point obtained by re-projecting the at least one light source included in the image onto the image based on the result of the positioning processing; and correct the height of the imaging device based on the re-projected point and the first coordinate position of the at least one light source included in the image.

3. The information processing apparatus according to claim 2, wherein the one or more processors are configured to:

find a first elevation/depression angle as an elevation/depression angle from the imaging device to the at least one light source from the first coordinate position inside the image of the at least one light source included in the image;

find a second elevation/depression angle as an elevation/depression angle from the imaging device to the re-projected point;

find a distance in a horizontal direction between the at least one light source and the imaging device based on the coordinate position of the at least one light source included in the image in the three-dimensional space and a positioning result of the imaging device;

calculate a correction value for the height of the imaging device based on the distance, the first elevation/depression angle, and the second elevation/depression angle; and correct the height of the imaging device based on the correction value.

4. The information processing apparatus according to claim 1, wherein the one or more processors are configured to use a unit vector of a three-dimensional direction vector using a focal point of the imaging device as a start point and the coordinate position of the at least one light source included in the image in the three-dimensional space as an end point to perform the positioning processing.

5. The information processing apparatus according to claim 1, wherein;

each of the plurality of light sources is configured to modulate light and transmit identification information on the light source concerned; and the one or more processors are configured to detect identification information and the first coordinate position of the at least one light source included in the image captured with the imaging device, and acquire the coordinate position of the at least one light source corresponding to the identification information in the three-dimensional space.

6. The information processing apparatus according to claim 1 further comprising two or more imaging devices, wherein the one or more processors are configured to derive at least either of the coordinate position and the orientation of the own device based on images captured with the two or more imaging devices.

7. An information processing method comprising:

acquiring a first coordinate position inside an image of at least one light source included in an image captured with an imaging device among a plurality of light sources whose coordinate positions in a three-dimensional space are known;

estimating a height of the imaging device in the three-dimensional space;

performing positioning processing to derive at least either of a coordinate position and an orientation of an own device in the three-dimensional space based on a coordinate position of the at least one light source included in the image in the three-dimensional space, the first coordinate position and the estimated height of the imaging device in the three-dimensional space;

acquiring a second coordinate position of the light source on the image corresponding to a positioning processing result; and correcting the height of the imaging device based on the first coordinate position and the second coordinate position.

8. A non-transitory computer-readable recording medium storing a program causing a computer to at least perform:

acquire a first coordinate position inside an image of at least one light source included in an image captured with an imaging device among a plurality of light sources whose coordinate positions in a three-dimensional space are known;

estimate a height of the imaging device in the three-dimensional space;

perform the positioning processing to derive at least either of a coordinate position and an orientation of an own device in the three-dimensional space based on a coordinate position of the at least one light source included in the image in the three-dimensional space, the first coordinate position and the estimated height of the imaging device in the three-dimensional space;

acquire a second coordinate position of the light source on the image corresponding to a result of the positioning processing; and correct the height of the imaging device based on the first coordinate position and the second coordinate position.

\* \* \* \* \*